United States Patent
Mallet et al.

(10) Patent No.: US 10,013,800 B1
(45) Date of Patent: *Jul. 3, 2018

(54) SYSTEMS AND METHODS FOR COORDINATED EDITING OF SEISMIC DATA IN DUAL MODEL

(71) Applicants: PARADIGM SCIENCES LTD., Grand Cayman (KY); Jean-Laurent Mallet, Luxembourg-Beggen (LU)

(72) Inventors: Jean-Laurent Mallet, Luxembourg-Beggen (LU); Jean-Claude Dulac, Sugarland, TX (US); Emmanuel Labrunye, Nancy (FR); Christophe Winkler, Messein (FR); Laurent Deny, Houston, TX (US)

(73) Assignees: EMERSON PARADIGM HOLDING LLC, Houston, TX (US); Jean-Laurent Mallet, Luxembourg-Beggen (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,454

(22) Filed: Aug. 4, 2017

Related U.S. Application Data

(63) Continuation of application No. 15/166,438, filed on May 27, 2016, now Pat. No. 9,728,003, which is a
(Continued)

(51) Int. Cl.
*G06T 17/05* (2011.01)
*G06T 3/20* (2006.01)
(Continued)

(52) U.S. Cl.
CPC ............. *G06T 17/05* (2013.01); *G01V 1/302* (2013.01); *G01V 99/005* (2013.01); *G06T 3/20* (2013.01);
(Continued)

(58) Field of Classification Search
CPC ................................ G06T 15/00; G06T 17/05
See application file for complete search history.

(56) References Cited

U.S. PATENT DOCUMENTS

| | | |
|---|---|---|
| 4,672,546 A | 6/1987 | Flinchbaugh |
| 5,615,171 A | 3/1997 | Hildebrand |
| | (Continued) | |

OTHER PUBLICATIONS

Office Action issued for U.S. Appl. No. 15/166,438 dated Oct. 28, 2016.
(Continued)

*Primary Examiner* — Jeffrey Chow
(74) *Attorney, Agent, or Firm* — Pearl Cohen Zedek Latzer Baratz LLP

(57) ABSTRACT

A system and method may model physical geological structures. Seismic and geologic data may be accepted. A three-dimensional (3D) transformation may be generated between a 3D present day model having points representing present locations of the physical geological structures and a 3D past depositional model having points representing locations where the physical geological structures were originally deposited. An indication may be accepted to locally change the 3D transformation for a subset of sampling points in a first model of the models. The 3D transformation may be locally changed to fit the updated subset of sampling points. A locally altered or updated version of the first model and, e.g., second model, may be displayed where local changes to the first model are defined by the locally changed 3D transformation. The transformation may also be used to extract geobodies in the past depositional model.

20 Claims, 11 Drawing Sheets

Related U.S. Application Data continuation of application No. 14/860,084, filed on Sep. 21, 2015, now Pat. No. 9,355,494, which is a continuation of application No. 14/260,760, filed on Apr. 24, 2014, now Pat. No. 9,142,059, which is a continuation of application No. 12/909,981, filed on Oct. 22, 2010, now Pat. No. 8,743,115.

(60) Provisional application No. 61/254,438, filed on Oct. 23, 2009.

(51) Int. Cl.
*G01V 99/00* (2009.01)
*G01V 1/30* (2006.01)
*G06T 19/20* (2011.01)

(52) U.S. Cl.
CPC .......... *G06T 19/20* (2013.01); *G01V 2210/64* (2013.01); *G01V 2210/66* (2013.01); *G06T 2200/04* (2013.01); *G06T 2207/30181* (2013.01); *G06T 2219/2021* (2013.01)

(56) References Cited

U.S. PATENT DOCUMENTS

| | | | |
|---|---|---|---|
| 5,740,342 | A | 4/1998 | Kocberber |
| 5,930,730 | A | 7/1999 | Kirlin et al. |
| 6,078,869 | A | 6/2000 | Gunasekera |
| 7,184,991 | B1 | 2/2007 | Wentland et al. |
| 8,022,947 | B2 | 9/2011 | Wei et al. |
| 8,120,991 | B2 | 2/2012 | Koren et al. |
| 8,803,878 | B2 | 8/2014 | Andersen et al. |
| 9,142,059 | B1 | 9/2015 | Mallet et al. |
| 9,355,494 | B1 | 5/2016 | Mallet et al. |
| 2002/0022930 | A1 | 2/2002 | Dalley et al. |
| 2002/0038201 | A1 | 3/2002 | Balaven et al. |
| 2005/0228623 | A1 | 10/2005 | Leflon et al. |
| 2008/0243454 | A1 | 10/2008 | Mallet |
| 2009/0157322 | A1* | 6/2009 | Levin ............... G01V 1/34 702/16 |
| 2010/0245347 | A1* | 9/2010 | Dorn ............... G01V 1/30 345/419 |
| 2013/0204598 | A1 | 8/2013 | Mallet |
| 2013/0231903 | A1 | 9/2013 | Li et al. |
| 2014/0207430 | A1 | 7/2014 | Li et al. |
| 2015/0009215 | A1 | 1/2015 | Vallikkat Thachaparambil et al. |

OTHER PUBLICATIONS

Notice of Allowability issued for U.S. Appl. No. 14/312,018 dated Mar. 7, 2017.
Cary, "Common-offset-vector Gathers: an Alternative to Cross-spreads for Wide-azimuth 3-D surveys", SEG Annual Meeting, Society of Exploration Geophysicists, 1999, pp. 1-4.
Vermeer, "3-D Seismic Survey Design", Society of Exploration Geophysicists, Tulsa, Oklahoma, USA, Geophysical References Series No. 12, 2002.
Vermeer, "3D Seismic Survey Design", Society of Exploration Geophysicists, Tulsa, Oklahoma, USA, Second Edition, Geophysical References Series No. 12, 2012.
Notice of Allowability issued for U.S. Appl. No. 15/166,438 dated Mar. 24, 2017.
Office Action issued for U.S. Appl. No. 15/271,389 dated Mar. 24, 2017.
Corrected Notice of Allowability for U.S. Appl. No. 15/262,124 dated Apr. 17, 2017.
Notice of Allowability issued for U.S. Appl. No. 15/271,389 dated Jun. 29, 2017.
Office Action issued for U.S. Appl. No. 15/258,776 dated Jul. 11, 2017.
T. Frank "Advanced Visualization and Modeling of Tetrahedral Meshes" Apr. 2006, pp. 1-140.
Office Action issued for U.S. Appl. No. 15/203,633 dated Jul. 12, 2017.
Office Action issued for U.S. Appl. No. 14/485,018 dated Aug. 9, 2017.
Office Action issued for U.S. Appl. No. 15/600,485 dated Sep. 8, 2017.
Caumon, et al., "Three-Dimensional Implicit Stratigraphic Model Building From Remote Sensing Data on Tetrahedral Meshes: Theory and Application to a Regional Model of La Popa Bsin, NE Mexico", IEEE Transactions on Geoscience and Remote Sensing, vol. 51, No. 3, Mar. 2013, pp. 1613-1621.
Office Action issued for U.S. Appl. No. 14/526,844 dated Sep. 15, 2017.
Notice of Allowability issued for U.S. Appl. No. 15/600,485 dated Sep. 28, 2017.
Ernens, "Finite Element Methods with exact geometry representation", Master of Science Thesis, Delft University of Technology, Nov. 2011. 128 pages.
Final Office Action issued for U.S. Appl. No. 13/458,264 dated Aug. 28, 2017.
Hauge, V.L. et al. "Flow-based grid coarsening for transport simulations." In: Proceedings of ECMOR XII—12th European Conference on the Mathematics of Oil Recovery (EAGE), Oxford, UK, Sep. 6-9, 2010.
Office Action issued for U.S. Appl. No. 15/631,368 dated Oct. 13, 2017.
Office Action issued for U.S. Appl. No. 15/299,566 dated Oct. 19, 2017.
Office Action issued for U.S. Appl. No. 15/205,281 dated Nov. 13, 2017.
Office Action issued for U.S. Appl. No. 15/669,454 dated Nov. 22, 2017.
Office Action issued for U.S. Appl. No. 13/458,264 dated Jan. 4, 2018.

* cited by examiner

SYSTEMS AND METHODS FOR COORDINATED EDITING OF SEISMIC DATA IN DUAL MODEL

CROSS-REFERENCE TO RELATED APPLICATIONS

This application is a continuation of U.S. patent application Ser. No. 15/166,438, filed May 27, 2016, issued as U.S. Pat. No. 9,728,003, which is a continuation of U.S. patent application Ser. No. 14/860,084, filed Sep. 21, 2015, issued as U.S. Pat. No. 9,355,494, which is a continuation of U.S. patent application Ser. No. 14/260,760, filed Apr. 24, 2014, issued as U.S. Pat. No. 9,142,059, which is a continuation of U.S. patent application Ser. No. 12/909,981, filed Oct. 22, 2010, issued as U.S. Pat. No. 8,743,115, which claims the benefit of prior U.S. Provisional Application Ser. No. 61/254,438, filed Oct. 23, 2009, all of which are incorporated herein by reference in their entirety.

FIELD OF THE INVENTION

The invention pertains to the general field of modeling stratified terrains in the subsurface.

The invention pertains to generating a first present day model representing stratified terrains and generating a second corresponding depositional model representing the stratified terrains at the geological-time at which they were originally deposited within the Earth.

BACKGROUND OF THE INVENTION

Erosion and tectonic activity through time transform an initially uniform stratified terrain composed of a continuous stack of level surfaces to a terrain fractured by faults forming discontinuities across the originally continuous horizons. Accordingly, to model the subsurface at the original time of deposition from seismic data (e.g., associated with seismic cubes) and/or geologic data (e.g., associated with well markers along well paths) collected from the present day subsurface structures (e.g., to "reverse time"), the model may simulate a reversal of such the erosion and tectonic activity.

However, modeling mechanisms used to generate models at the original time of deposition often use extensive simplifications and the data used to generate models may have significant uncertainties, thereby rendering the models inaccurate.

Accordingly there is a need in the art to more accurately model present day structures at a geological-time when they were originally deposited and to correct errors in that model.

SUMMARY OF THE INVENTION

Embodiments of the invention provide a system and method for modeling stratified terrains of a geological subsurface at the time of geological deposition, e.g., including geological horizons and faults.

Embodiments of the invention provide a system and method for generating models representing both the geometry of geological structures, e.g., horizons, and geological properties of those structures. Models may be generated by incrementally modifying horizons and faults to provide an accurate model even in the presence of non vertical faults.

Embodiments of the invention provide a system and method for interactively editing the location or physical property values of points in a present day or recent geological model (in "G space") or in a corresponding past depositional model (in "G* space"), the points representing physical subsurface structures. Geological models in G space and/or G* space may be, for example, a digital rendering of seismic and geologic data, e.g., defined by cells, nodes, vertices, facets, voxels, pixels, etc., that estimate or approximate the likely position of groups of underground particles. A transformation may defined a relationship between the present day model in G space and past depositional models in G* space. Embodiments of the invention may include, when the location or properties of points in either model are modified, automatically modifying the corresponding points in the other model accordingly. In this way, a user may interact or edit a depositional time model (where structures and properties are uniformly distributed) and the user may view the corresponding edits implemented in the present day complex faulted model, where such edits would be difficult to implement, e.g., particularly across faults.

Embodiments of the invention provide a system and method for modelling physical geological structures. Seismic data may be accepted. A global transformation may be generated between a present day model having points representing present locations of the physical geological structures and a past depositional model having points representing locations where the physical geological structures were originally deposited. The global transformation may be a three dimensional (3D) transformation, which may be generated, for example, by functions that are continuous everywhere except across faults. An indication may be accepted, e.g., from a user, to change the global transformation for a subset of sampling points in the models. The global transformation for the subset of sampling points may be updated. An updated version of at least one of the models may be displayed.

Embodiments of the invention provide a system and method for simultaneously editing corresponding models representing the same physical geological structures. Seismic data (e.g., associated with each seismic cube) and/or geologic data (e.g., well markers along well paths) may be accepted. A first model and a second model may be displayed. One model may represent present day locations of the physical geological structures and the other model may represent locations where the physical geological structures were originally deposited in the past. The first and second models may be related by a 3D transformation based on at least three functions continuous everywhere except across faults. Graphical user input may be accepted (e.g., via an input device, keyboard, mouse, etc.) for editing property values assigned to a first subset of points of the first model. The same edited property values may be automatically assigned to a second subset of points of the second model, wherein the second subset of points are the image of the first subset of points as defined by the transformation between the first and second models. The second subset of points in the second model may be displayed with the automatically assigned property values.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

Figure 1:
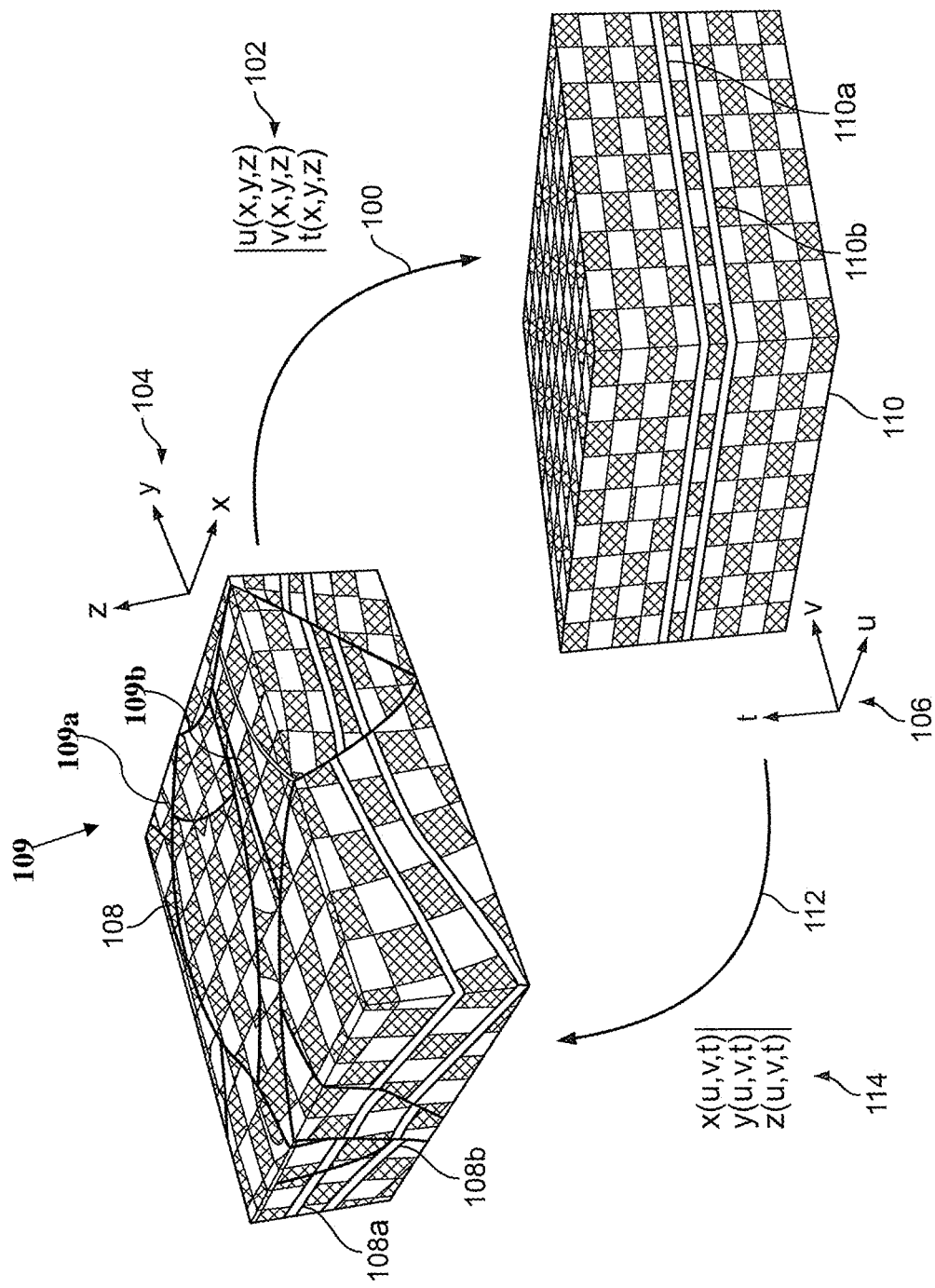
FIG. 1 is a schematic illustration of a uvt-transformation between a present day geological model and a past depositional model in respective 3D spaces according to an embodiment of the invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION

For the sake of clarity and for the purpose of simplifying the presentation of embodiments of the invention, the following preliminary non-limiting descriptions are given.

Geological-Time

A particle of sediment in a geological terrain may be observed at a location in the subsurface. The location of the particle may be mathematically represented or modeled, e.g., by a vector, (x,y,z), in a three-dimensional (3D) space, such as the Cartesian coordinate system (of course, when modelling such particles, the position of many particles may be modeled together as for example using a cell). When modeled, a data structure such as a node or cell may represent particles. The locations of the points or data structures in the model may be estimates and approximations of the real locations of the particles they represent, which may have some error. The time when the particle of sediment was originally deposited may be referred to as the "geological-time" and may be represented or modeled, e.g., as a geological-time function of the present day location of the particle, t(x,y,z). When used herein, a "present day" location for a particle (or data structure representing one or more particles) or subsurface feature may mean the location of the item in the current geological time period (not necessarily exactly today's date), relative to geological time. The actual geological-time of the deposition of particles may be difficult to determine and may be replaced, e.g., by any arbitrary monotonic increasing function of the actual geological-time. The geological time function t(x,y,z) may instead provide the relative times or time order when structures were deposited (e.g., a greater (t) value corresponding to relatively younger, more recently deposited structures), not necessarily the real times. The monotonic function may be referred to as the "pseudo-geological-time". Geological-time and pseudo-geological-time are referred to interchangeably herein.

Horizon, Fault and Unconformity

In stratified layers, horizons, faults and unconformities may be curvilinear surfaces which may be for example characterized as follows:

A horizon, H(t), may be a surface corresponding to a plurality of particles of sediment which were deposited approximately at substantially the same geological-time, t.

A fault may be a surface of discontinuity of the horizons that may have been induced by a relative displacement of terrains on both sides of such surfaces. In other words, the geological-time (t) of deposition of the sediments is discontinuous across each fault. Faults may cut horizons and may also cut other faults.

An unconformity may be a surface of discontinuity of the horizons that may have been induced by for example an erosion of old terrains replaced by new ones. In other words, similarly to faults, the geological-time (t) of deposition of the sediments is discontinuous across each unconformity. When discussed herein, unconformities are treated as faults: as a consequence, in this patent application, faults may include both real faults and unconformities.

Reference Horizons and Control-Points

The geological domain may be characterized by a series of "reference horizons" $\{H(t_1), H(t_2), \ldots, H(t_n)\}$, which may be separate geological layers with significantly distinct physical properties and associated with distinct geological-times of deposition $\{t_1, t_2, \ldots, t_n\}$, respectively. When discussed herein, the horizons are implicitly assumed to be sorted according to their geological-times of deposition so that $H(t_1)$ is assumed to correspond to the older sediments and $H(t_n)$ to the younger. In other words, the deposition time $t_i$ of $H(t_i)$ is older than the deposition time $t_{i+1}$ of $H(t_{i+1})$. In practice, each reference horizon $H(t_i)$ is observed on a set of sampling points referred to as "control-points" at which the geological-time function may approximate $t_i$ as closely as possible. Control-points may be a set of points generated from seismic data and well data which have been identified, e.g., automatically by a computer and/or manually by a user, as representing to the same horizon, fault, or other geological structure.

Level Surface (Also Referred to as "Iso-Surface")

The geological domain may be defined in a 3D space by a given function of geological-time, t(x,y,z). The geological-time function t(x,y,z) may be monotonic, i.e., the gradient of the geological-time does not vanish and the function has no local maximum or minimum values. A level surface, $H(t_0)$, may be the set of points where the geological-time t(x,y,z) is equal to a given numerical value, $t_0$. Therefore, if the geological-time t(x,y,z) represents a pseudo-geological-time of deposition, then the level surface $H(t_0)$ of t(x,y,z) may be a geological horizon. Level surfaces may also be referred to as "isovalue-surfaces" or, simply, "iso-surfaces". In one embodiment of this invention, the geological time may be defined at the vertices of a mesh, lattice or grid (e.g., a tetrahedral mesh) and the iso-value surfaces may be extracted, according to mechanisms known in the art.

Various mechanisms are currently used for modeling subsurface geological terrains:

GeoChron Model and Uvt-Transform

When a layer of particles was deposited during a certain geological-time period in the past, the layer typically had uniform properties, such as particle density, porosity, etc. However, through time, the layers erode and are disrupted by faults, tectonic motion or other sub-surface movements, which result in uneven and discontinuous layers. As compared to the uniform layers of the past, the discontinuous layers of the present are difficult to model.

Accordingly, the "GeoChron" model has recently been developed to operate between two 3D spaces, for example:

A 3D space, G, representing a geological model of the present day subsurface features (e.g., current or recent modeled locations of particles of sediment in the terrain). The modeled location of each particle may be represented by the coordinates (x,y,z), where (x,y) describes the geographical coordinates of the particle (e.g., latitude and longitude) and (z) describes the altitude or distance below a surface level; and A 3D space, G*, representing a geological model of locations of particles of sediment at the time when the particles were originally deposited. The modeled location of each particle may be represented by the coordinates (u,v,t) where (t) is the pseudo-geological-time of deposition of the particle and (u,v) is the paleo-geographical coordinates of the particle at geological-time (t).

The GeoChron model defines a transformation between the two 3D spaces G and G*. The transformation may be referred to as a "uvt-transformation". The GeoChron model applies a forward uvt-transformation to transform the present day model (a model of the subsurface features in present or recent time) in G space to the original deposition model in G* space and applies an inverse uvt-transformation to transform the original deposition model in G* space to the present day model in G space. Accordingly, a processor applying the GeoChron model may execute complex computations on the original deposition model in G* space where geological properties are typically uniform and simple to manipulate relative to the discontinuous present day model in G space. Once the original deposition model is sufficiently accurate, the GeoChron model may be used to transform the model back to the present day time domain to generate the present day model.

Other subsurface models and other transforms between present day and past models may be used with embodiments of the present invention.

Figure 9:
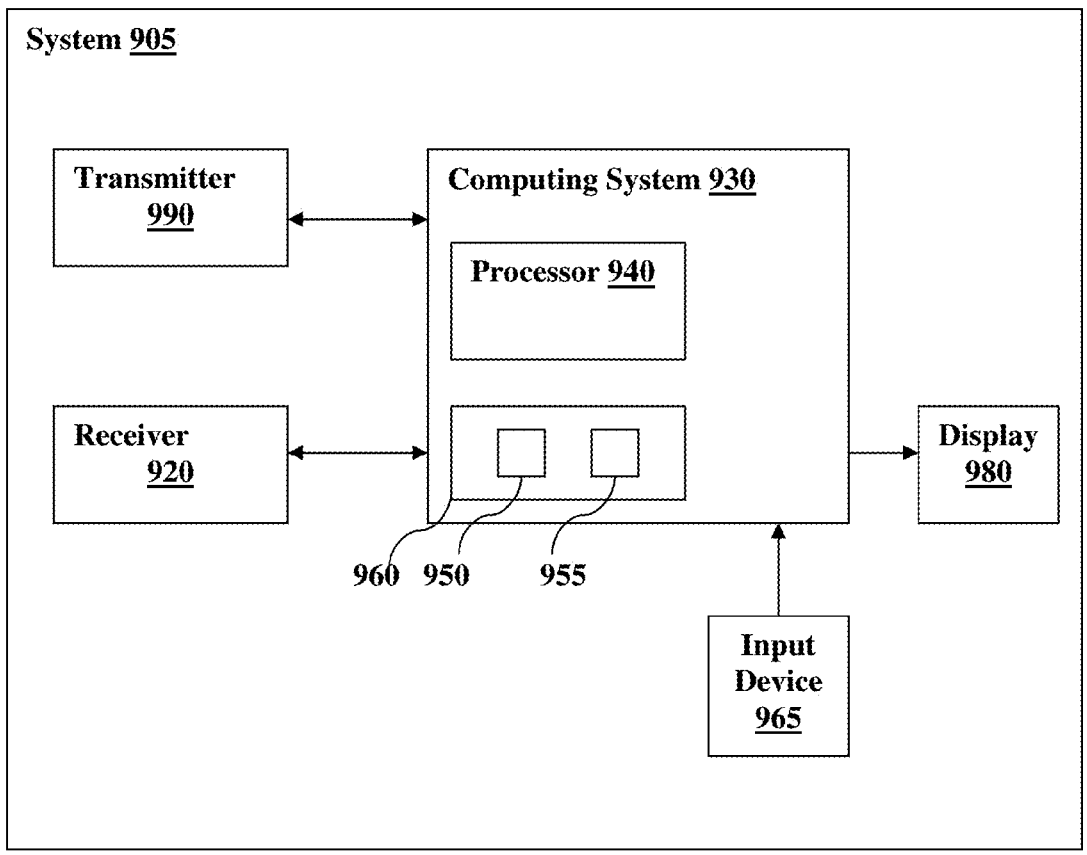
FIG. 9 is a schematic illustration of a system according to an embodiment of the invention.

When used herein, "generating" or "creating" a model or a subsurface feature may include creating (e.g., using a computer processor) data representing the model or feature, the data being stored for example in a computer system such as that shown in FIG. 9.

Reference is made to FIG. 1, which schematically illustrates a uvt-transformation between two 3D spaces G 104 and G* 106 according to an embodiment of the invention.

The "forward" or "direct" uvt-transformation 100 defines parametric functions 102 {u(x,y,z),v(x,y,z),t(x,y,z)}, which transform each point (x,y,z) of the geological G space 104 to a point {u(x,y,z),v(x,y,z),t(x,y,z)} in the depositional G* space 106. The forward uvt-transformation 100 may be represented, for example, as follows:

$$(x, y, z) \xrightarrow{UVT} \{u(x, y, z), v(x, y, z), t(x, y, z)\} \quad [1]$$

A processor using the forward uvt-transformation 100 transforms each horizon H(t) (e.g., 108a or 108b) of model 108, in the G space 104, into a level horizontal plane H*(t) (e.g., 110a and 110b, respectively) of model 110 in the G* space 106. In the G* space 106, horizons 110a and 110b of model 110 are simply the level surfaces of the function t(x,y,z) representing the geological-time at location (x,y,z) in the G space. That is, since a horizon models a set of particles of sediment that was uniformly deposited in time, each horizon is constant at the time when the particles modeled thereby were originally deposited (e.g., in G* space 106). Therefore, each horizon 110a and 110b in G* space 106 may be uniquely defined by a single time, (t). The forward uvt-transformation 100 removes faults F(t) 109 (e.g., 109a, 109b, 109c, . . . ) of model 108, in the G space 104, by joining corresponding fault edges of model 110 in the G* space 106, thereby simulating the reversal the effects of erosion and tectonic activity through time.

Conversely, the "inverse" or "reverse" uvt-transformation 112 defines parametric functions 114 {x(u,v,t), y(u,v,t), z(u,v,t)}, which a processor may use to transform each point (u,v,t) of the depositional G* space 106 to a point {x(u,v,t), y(u,v,t), z(u,v,t)} in the geological G space 104. The inverse uvt-transformation 112 may be represented, for example, as follows:

$$(u, v, t) \xrightarrow{UVT^{-1}} \{x(u, v, t), y(u, v, t), z(u, v, t)\} \quad [2]$$

In practice, such a reverse transformation may be restricted to a part G*o of the G* space called the holostrome and corresponding to the particles of sediment which can actually be observed today in the G space.

As shown in [1], uvt-transformation 100 transforms each point (x,y,z) in present day G space 104 independently in each of the (three) different coordinates (u,v,t) in depositional G* space 106, for example, using three independent functions {u(x,y,z), v(x,y,z), t(x,y,z)}. Thus, uvt-transformation 100 is a three-dimensional (3D) transformation. Similarly, inverse uvt-transformation 112, e.g., shown in equation [2], transforms each point (u,v,t) in depositional G* space 106 independently in each of the (three) different coordinates (x,y,z) in present day G space 104, for example, using three independent functions {x(u,v,t), y(u,v,t), z(u,v, t)}. Thus, inverse uvt-transformation 112 is a 3D transformation. Transformations 100 and 112 may be considered as the forward and reverse components of the same transformation. Transformations 100 and 112 may be considered "global" transformations since the same transformation, e.g., a vector field or interpolation, operates on a region or all points in models 108 and/or 110. In some embodiments, the inverse (or reverse) uvt-transformation 112 may only be defined (e.g., with a non-trivial identity transformation) in regions of G*space 106 not affected by erosion or other predefined types of geological activity. It may be noted that, contrary to other transformations (referred to as "xyt-transforms"), which transform (x,y,z) coordinates to (x,y,t) coordinates leaving two dimensions (x) and (y) unchanged and only transforming 1D (a simple vertical stretching) from the z-axis to a t-axis, the uvt transformation may move points in three dimensions (e.g., with three degrees of freedom) and, for example, correctly works even in the presence of non-vertical faults (e.g., faults having a range of x and y values).

Using the forward uvt-transformation 100, e.g., defined in equation (1), and the inverse uvt-transformation 112, e.g., defined in equation (2), any geological property may be modeled in one of the two spaces (G space 104 or G* space 106) and the result of the property modeled in one space may be transferred to the other space (G* space 106 or G space 104, respectively). In practice, a geological property is typically modeled in the space where modeling the property is the simplest.

Model 108 (of FIG. 1) defined by the functions $u(x,y,z)$, $v(x,y,z)$ and $t(x,y,z)$ may be piecewise continuous. Typically, the only discontinuities of these functions may represent subsurface fractures induced by fault surfaces. At the geological-time of deposition of the particles of sediment, before faulting induced by tectonic events occurred, the subsurface layers were continuously formed and may therefore be represented by model 110 defined by functions $u(x,y,z)$, $v(x,y,z)$ and $t(x,y,z)$ that are likewise continuous. Therefore, present day model 108, which may be a transformation of these continuous functions, may "inherit" such a paleo-continuity across faults surfaces in the model. Modelling such behavior of functions $u(x,y,z)$ and $v(x,y,z)$ across the faults in model 110 may be used to more accurately construct these functions across the faults in the present day model 108. In the GeoChron model, the fault structure may be known prior to generating the transformation functions and may be integrated into the functions as constraints. Representations of present day model 108 in G space 104 and its uvt-transformation 100 image depositional model 110 in G* space 106 may be displayed to a user on a monitor, e.g., display 980 of FIG. 9.

Figure 2:
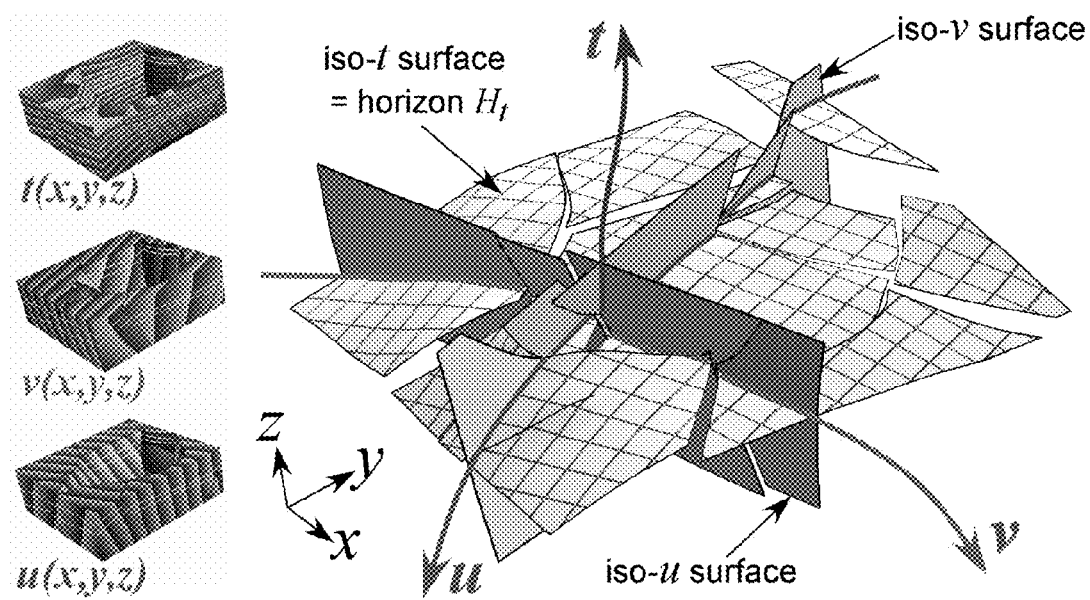
FIG. 2 is a schematic illustration of a curvilinear uvt coordinate system used for transforming points between the two 3D spaces of FIG. 1 non-linearly, according to an embodiment of the invention.

Reference is made to FIG. 2, which schematically illustrates a curvilinear uvt coordinate system that transforms the non-uniform present day model 108 in G space 104 to generate the uniform model 110 in G* space 106 according to an embodiment of the invention. The curvilinear uvt coordinate axes represent the curvilinear deformation used to transform level surfaces in G space 104 to constant or horizontal sections in G* space 106. The uvt coordinate axes having an orthogonal shape in G* space 106 have a curvilinear shape in G space 104.

An orthogonal uvt coordinate system in G* space 106 may be defined so that the intersections of level surfaces in G space 104 are mapped to constant values of u, v and t under the uvt transformation. Such a uvt coordinate system may have a curvilinear shape when viewed in the G space 104. For example, under the uvt transformation:
- a curvilinear u-axis intersecting a point $(x,y,z)$ may correspond to the intersection of the iso-v and iso-t level surfaces crossing at point $(x,y,z)$;
- a curvilinear v-axis intersecting a point $(x,y,z)$ may correspond to the intersection of the iso-u and iso-t level surfaces crossing at point $(x,y,z)$; and
- a curvilinear t-axis intersecting a point $(x,y,z)$ may correspond to the intersection of the iso-u and iso-v level surfaces crossing at point $(x,y,z)$.

In some embodiments:
The curvilinear t-axis may correspond to a set of points in G space 104 which were deposited at the same $(u,v)$ paleo-geographic coordinates. Accordingly, the curvilinear t-axis may be referred to as an "Iso-Paleo-Geographic line" or, simply, an "IPG-line".

IPG-lines and the u and v curvilinear axes are discontinuous across faults.

IPG-lines in G space 104 may be transformed to vertical straight-lines in G* space 106 under the uvt transformation.

The Xyt-Transform

Computing the $(u,v)$ paleo-geographic coordinates described above may include solving a complex system of coupled differential equations. To bypass the difficult problem, modeling mechanisms known in the art avoided the uvt transformation and instead used a simpler transformation, a "xyt-transform". The xyt-transform may be defined by a simple parameterization of the x,y,z coordinates, for example, as follows:

$u=f(x,y,z)=x$ and $v=g(x,y,z)=y$ where parametric functions $f(x,y,z)$ and $g(x,y,z)$ are defined by the present day geographic coordinates x and y. The level surfaces of the functions $f(x,y,z)$ and $g(x,y,z)$ are typically vertical planes whose intersections are vertical lines. Such a definition implies that, contrary to the uvt transformation above, under the xyt transformation the IPG lines in G space 104, i.e., the set of points in G space 104 which were deposited at the same coordinates $f(x,y,z)$ and $g(x,y,z)$ i.e., the same coordinates x and y, are vertical straight-lines continuous across the faults. Such an approach may provide for example the following drawbacks:

In the presence of a reverse fault, several particles of sediment modeled in the present day model 108 in G space 104 and located at multiple intersections of a vertical straight-line through $(x0,y0)$ and a horizon $H(t)$ will have exactly the same paleo-geographic coordinates $(f(x,y,z)=x0, g(x,y,z)=y0,t)$. Accordingly, the xyt transformation models these multiple distinct particles of sediment in exactly the same location in the xyt transformed space. This is clearly an error since two distinct particles of sediment observed today in G space cannot have been deposited at the same location and time.

In the presence of a normal fault, a vertical line through $(x0,y0)$ may intersect the fault and not intersect a given horizon $H(t)$. As a consequence, the point $(f(x,y,z)=x0, g(x,y,z)=y0,t)$ in the depositional xyt transformation space may have no reverse image by reverse xyt-transform back to the present day G space. This induces holes in the depositional xyt transformation space. This is clearly an error since each particle of sediment observed today in G space must have been deposited and therefore must exist somewhere in the depositional xyt transformation space.

Since under the xyt transform, reverse faults in the present day model generate duplicate points in the depositional model and normal faults in the present day model generate holes in the depositional model, only perfectly vertical faults in present day models may be correctly modeled at the time of deposition. Since vertical faults are extremely rare, the xyt transformation is highly inaccurate.

Under the uvt-transformation point along both normal and reverse faults in the present day may be correctly modeled by a one-to-one correspondence with points in the depositional models thereby avoiding the aforementioned inaccuracies of the xyt transformation.

While the xyt transform is imperfect, embodiments of the invention may be used in combination therewith.

Wheeler Model

The Wheeler model, introduced by H. Wheeler in the 1950's, represents geological terrains at depositional geological-time. The practical implementations of the Wheeler model are implicitly based on xyt-transforms. Accordingly, as described above, this simplified approach is only accurate in the particular (and improbable) case where all the faults are strictly vertical. However, while the Wheeler model is imperfect, embodiments of the invention may be used in combination therewith.

Virtual Camera

A "virtual camera" may be a graphical device or tool executed by or produced by a computer (e.g., computing system 905 of FIG. 9) for generating visualizations of geological numerically models. A virtual camera may include a software module which when executed transforms numerical encoding of geological structures into a visualization or image. In one non-limiting example, these images may be displayed in two dimensions (2D) on a screen of a computer or in three dimensions (3D) on a 3D device such as a cave such as a 3D chamber having vertically and horizontally oriented screens (e.g., a room where the walls, ceiling and floor are screens).

Seismic Cube Grid (SG) and Properties

A seismic cube, also referred to as a "seismic-grid" (SG), may be a regular three dimensional structured grid, for example, defined as follows:

The edges of seismic cube grid SG may be rectilinear, orthogonal to each other, and parallel to a (x,y,z) rectilinear coordinate system:
  The x and y axes may define a horizontal plane of a present day geographical coordinate system in G space 104.
  The z axis may define a vertical direction and may represent depth, altitude or seismic geological time varying in the vertical direction.

Cells of seismic cube grid SG may be hexahedral (e.g., cubic) and are preferably uniform in size in the x, y and z directions.

Each cell C of seismic cube grid SG may be defined by the coordinates x(C), y(C) and z(C), e.g., at the center of the cell C:
  x(C) may be referred to as the "in-line" coordinate of C,
  y(C) may be referred to as the "cross-line" coordinate of C,
  A column of cells, each corresponding to a single pair (x,y) of in-line and cross-line coordinates and having different (z) coordinates, may be referred to as a seismic trace.

These cells may correspond to or represent estimates or approximations of the position of individual and groups of actual subsurface particles.

The amplitude of a seismic signal may be measured and sampled at the centers x(C), y(C) and z(C) of all cells C along each seismic-trace of seismic cube grid SG. For each seismic-trace corresponding to a single pair (xi,yj) of in-line and cross-line coordinates, a continuous one dimensional function A(z|xi,yj) may be generated that interpolates the seismic amplitudes associated with the corresponding seismic-trace. Each one dimensional function A(z|xi,yj) may be transformed, e.g., by computing the Hilbert transform of the function A(z|xi,yj), to derive a series of new functions, for example, referred to as "seismic-attributes" which, for example, together with the function A(z|xi,yi), may be referred to as a "seismic-properties" functions. The seismic properties or attributes associated with each cell may be determined by sampling the seismic-properties functions at each cell of seismic cube grid SG. The values of the seismic-properties functions may be stored with the data for each cell. The seismic properties may be computed at locations corresponding to the centers or vertices of the cells of seismic cube grid SG and may be stored in the cells of the of seismic cube grid SG, for example, as another coordinate value, (e.g., "Gprop"), to generate point coordinates, (x,y,z,Gprop), where Gprop is the 1D value for the seismic property function. Seismic and/or geological properties are physical properties associated with the geological structured being modeled. For example, geological and seismic properties include porosity, density, geological-time, unwrapped-instantaneous-phase, coherency, impedance, envelop, etc. Other properties may be used.

The GeoChron Model and Seismic-Cubes

The following is an example of one process used to generate a GeoChron model and a seismic-cube in a computer (other models may be used). This process (and others herein) may be for example carried out by a processor executing code or software instructions, e.g. the system 905 shown in FIG. 9:

1) A network of faults F(t) (e.g., faults 109 of FIG. 1) may be modeled, e.g., according to mechanisms known in the art.

Figure 3:
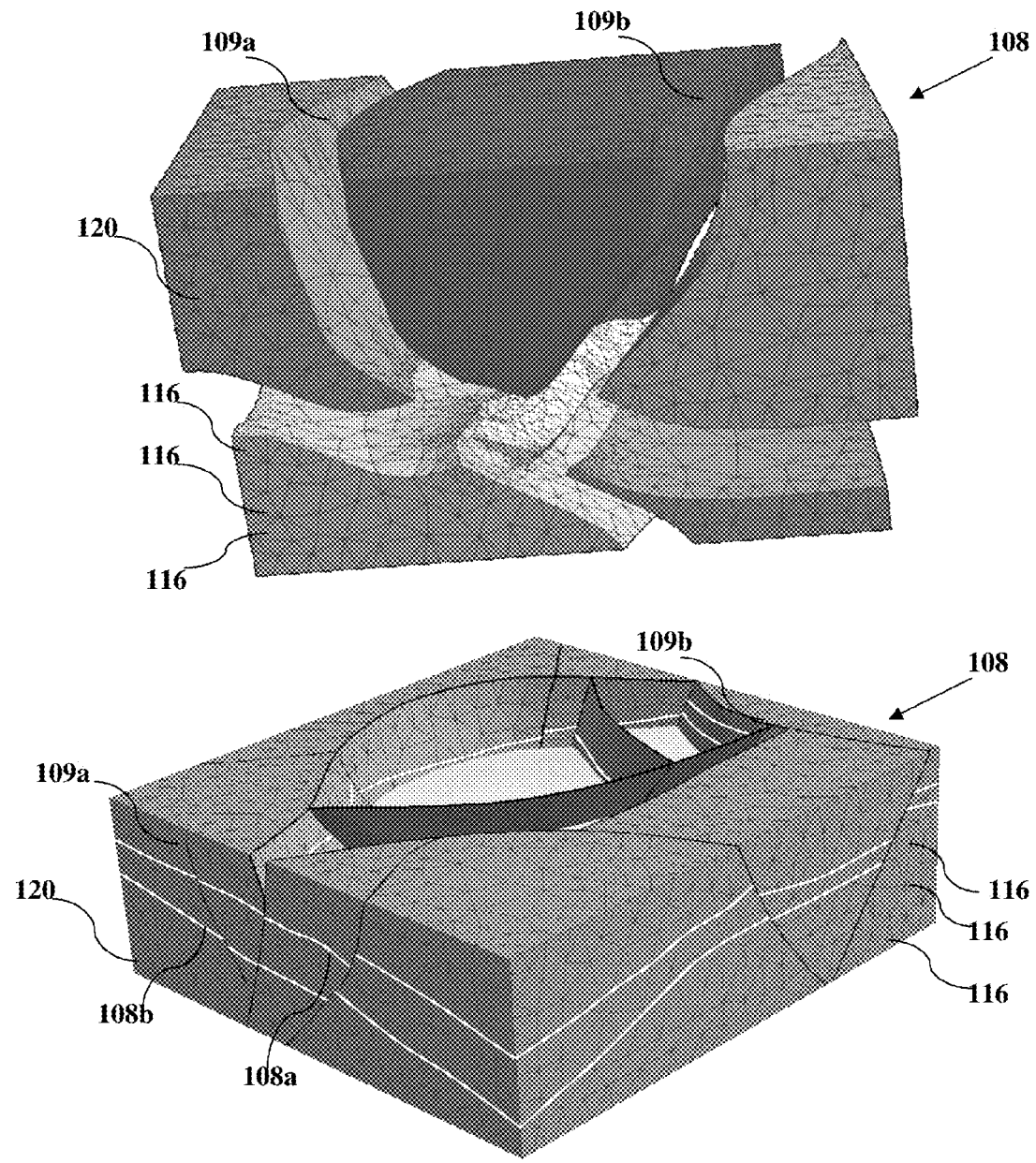
FIG. 3 is a schematic illustration of an exploded and collapsed view of a present day geological model decomposed into tetrahedral cells according to an embodiment of the invention.

2) A 3D geological domain in G space 104 may be covered by a mesh, lattice or grid GG including adjacent 3D polyhedral cells. Reference is made to FIG. 3, which schematically illustrates an exploded and collapsed or regular view of a geological present day model 108 in G space 104 having cells 116 in a grid GG 120 according to an embodiment of the invention. Cells 116 are tetrahedral shape, although any polygonal shape may be used, e.g., hexahedral. The edges of cells 116 may be tangent to the surfaces of faults 109 but do not cross these fault surfaces. The geometry of each cell 116 of grid GG 120 may be defined by the (x,y,z) coordinates at the vertices of that cell. Since the uvt-transformation eliminates faults 109 in the depositional model 110 in G* space 106, the transform functions u(x,y,z), v(x,y,z) and t(x,y,z) may be discontinuous across faults 109. To generate these discontinuities, grid GG 120 used to model these functions may itself be discontinuous, for example as follows:

Edges of cells 116 in grid GG 120 may be tangent to fault surfaces but do not cross these fault surfaces.

Collocated vertices of adjacent cells 116 on both sides of a fault 109 may be duplicated to store distinct location values u(x,y,z), v(x,y,z) and t(x,y,z) for each cell 116, e.g., attached at the vertices thereof. Accordingly, discontinuities of geometric and property functions may be accurately modeled across faults 109.

3) Paleo-geographic coordinates (u,v,t) may be computed, e.g., at the vertices of grid GG 120 or at the center or another point of each cell or voxel in grid 120, e.g., according to mechanisms known in the art. To generate the paleo-geographic coordinates (u,v,t), input data may include sets of sampling points {SH(t1), . . . ,SH(t$_n$)} located on reference horizons {H(t1), . . . ,H(t$_n$)}, respectively, and extracted from a seismic cube and/or sampling points observed on well curves (e.g., and referred to as well markers). Each set of sampling points may be associated with a depositional horizon {H(t1), . . . ,H(t$_n$)} or level set across each of which all points in the depositional model have the same depositional time value, (t1), . . . , (t$_n$), respectively.

4) The paleo-geographic coordinate functions may be generated to minimize the deformation of each point (x,y,z) or the cumulative deformation of a subset of points in the current model when they are transformed to their associated level set horizon $\{H(t1), \ldots, H(t_n)\}$ for their associated geological time, $t_i$, in past depositional model. The paleo-geographic coordinate functions $u=u(x,y,z)$, $v=v(x,y,z)$ and $t=t(x,y,z)$ may be fully defined by their values at the vertices of grid GG 120 or, for example, other points such as at the center or of each cell in grid GG 120. The value of the paleo-geographic coordinate functions $u(x,y,z)$, $v(x,y,z)$ and $t(x,y,z)$, may be determined throughout the geological domain by locally interpolating values of the functions at each point $(x,y,z)$ from values determined at the vertices of the cell containing the point $(x,y,z)$. Since the paleo-geographic coordinate functions define the uvt-transformation 100, defining the values of the paleo-geographic coordinate functions $(u,v,t)$ at each vertex of grid GG 120 may completely define the uvt-transformation 100 at any point $(x,y,z)$ in G space 104. Different numbers and shapes of cells 116 or resolutions of grid GG 120 may be used for different models or different sub-regions within a model. Cells 116 of grid GG 120 may have a resolution or size sufficiently to detail the variations of the paleo-geographic coordinate functions and geological time function. The number of cells 116 or resolution of grid GG 120 may, for example, depend on the "local" or "global" complexity of the horizons and fault network or discontinuities in the grid. In one embodiment, the number of cells 116 or resolution of grid GG 120 may be automatically determined. In another embodiment, the number of cells 116 or resolution of grid GG 120 may be set, adjusted, or re-calibrated by a user. In practice, the number of cells of grid GG 120 may be several orders of magnitude smaller than the number of cells of a seismic cube grid SG. For example, one hundred thousand cells 116 of grid GG 120 may be used to cover the same domain as a seismic cube grid SG including several tens of millions of cells.

5) A 3D geological domain in G* space 106 may be covered by a mesh, lattice or grid GG* 122. Note that grid GG* 122 may not be the image of grid GG 120. The grid GG* 122 may define property values and therefore may be referred to as a "property grid." Reference is made to FIG. 4, which schematically illustrates a uvt transformation 100 from a present day model 108 in G space 104 to a depositional model 110 in G* space 106 according to an embodiment of the invention. Depositional model 110 may be covered by a property grid GG* 122. Although property grid GG* 122 is shown in G* space 106, additionally or alternatively, a property grid may be defined in G space 104, for example, defining the properties at the vertices of grid GG 120. Property grid GG* 122 may include adjacent 3D polyhedral cells 124. In a preferred embodiment, polyhedral cells 124 may be tetrahedral or hexahedral shaped. Cells 124 of property grid GG* 122 may have a resolution or size sufficiently to detail the variations of the seismic properties throughout the model 110. The number of cells 124 or resolution of property grid GG* 122 may be the same or different as the number of cells 116 or resolution of geometry grid GG 120. Each cell 124 of property grid GG* 122 may store one or more seismic and/or geologic property values. In one example, a single property value may be defined for each cell 124 by the property value of a representative, e.g., center, point in the cell. In another example, each cell 124 may be defined by multiple property values. For example, property values may be collected and averaged at each of multiple points throughout the cell, e.g., at the vertices or center of edges, to generate a property average value. The representative or average property value may be stored at a point in the cell, e.g., the center point of the cell.

6) Property grid GG* 122 may be considered a "texture map" in G* space 106. The inverse paleo-geographic coordinates $x=x(u,v,t)$, $y=y(u,v,t)$, and $z=z(u,v,t)$ of the reverse uvt transformation 112 may be used to transport the property values of each cells 124 of property grid GG* 122 from G* space 106 to corresponding cells 116 of the grid GG 120 in G space 104. The property grid GG* 122 may be displayed on grid GG 120 by "texture mapping" on any surface of model 108 in G space 104.

Figure 5:
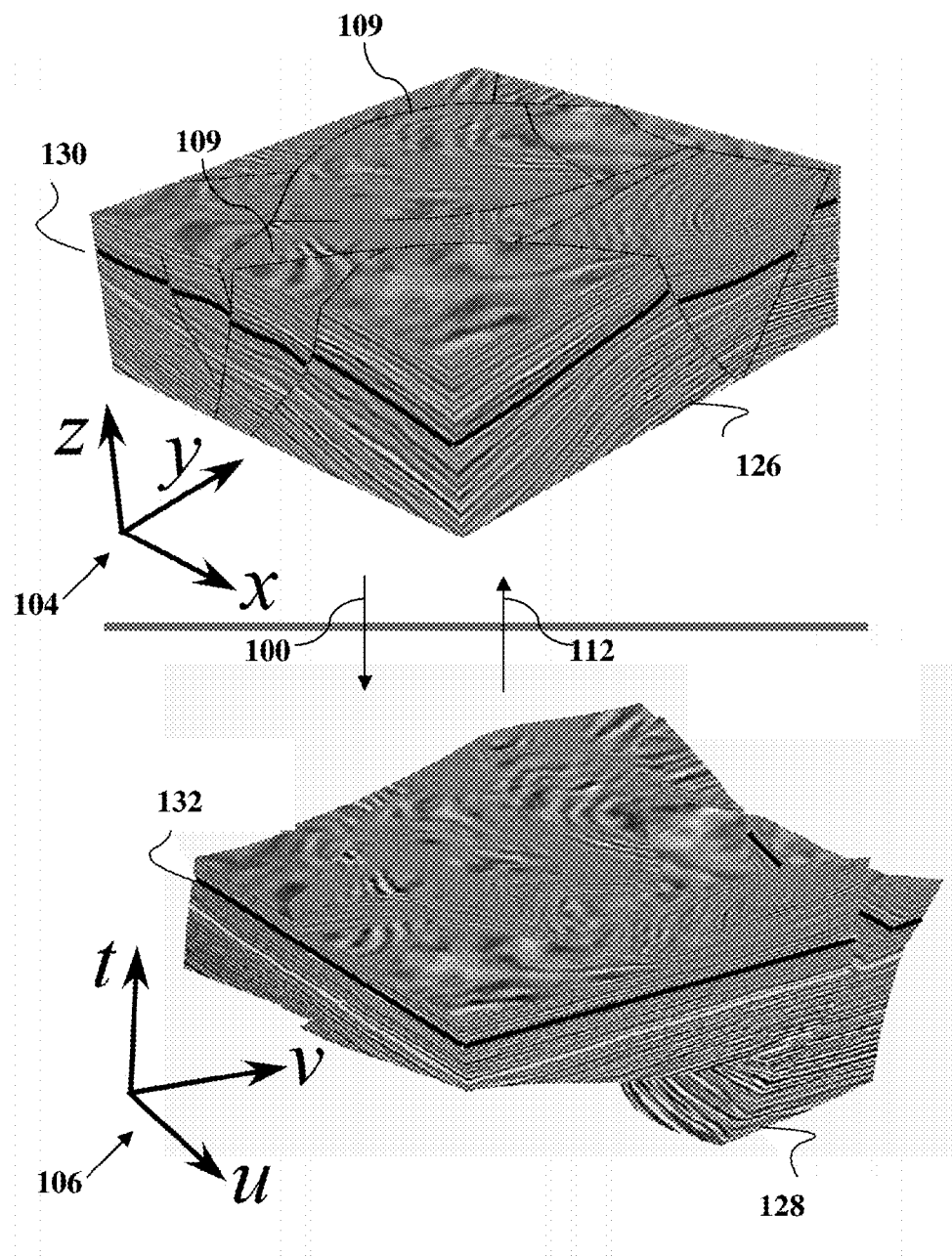
FIG. 5 is a schematic illustration of a faulted and a flattened seismic cube of the present day and past depositional models of FIG. 1, respectively, according to an embodiment of the invention.

7) The 3D geological domain in G space 104 may also be covered by a seismic cube grid SG. Reference is made to FIG. 5, which schematically illustrates a uvt transformation 100 from a seismic cube grid SG 126 of a present day model 108 in G space 104 to a flattened seismic cube grid SG* 128 of a depositional model 110 in G* space 106 according to an embodiment of the invention. It may be noted that, contrary to conventional mechanisms, in some embodiments there are no gaps or overlaps of points or cells in flattened seismic cube grid SG* 128. Seismic cube grid SG 126 may be a fine regular mesh or grid including adjacent 3D polyhedral, preferably hexahedral, cells. Each cell may store seismic amplitude data collected from seismic signals and seismic properties derived therefrom. Seismic data or geological data may be stored, for example, at the vertices or at the center points of each cell.

8) Flattened seismic cube grid SG* 128 in G* space 106 may be generated as the image of seismic cube grid SG 126 in G space 104 under the uvt-transformation 100. Flattened seismic cube grid SG 128 SG* may be generated using the uvt-transformation 100, for example, as follows:

For each cell SGC of seismic cube grid SG 126 in G space 104, generate the image SGC* of the cell SGC;

Store the seismic properties values for each cell SGC of seismic cube grid SG 126 in G space 104 in each cell 124 of property grid GG* 122 intersected by the cell SGC. In some embodiments, property grid GG* 122 may include cells 124, which do not correspond to the image of SGC and therefore, these cells 124 may not be assigned a seismic property value.

9) For each geological-time (t), a faulted/folded level surface 130 in G space 104 may be generated, e.g., using a "marching mechanism" (e.g., and a marching cube or marching tetrahedral) known in the art. Each folded or faulted level surface or horizon 130 in G space 104 may include sets of triangular facets that correspond to the horizon for that geological-time H(t). A flattened horizon 132 in G* space 106 may be generated as the image of the corresponding faulted or folded horizon 130 in G space 104 under the uvt-transformation 100 from which faults and folds are removed. Moreover, using 3D-texture mapping operations known in the art, faulted horizons 130 in G space 104 and flattened horizons 132 in G* space 106 may be "painted" or colored with seismic properties, for example, as follows:

Seismic cube grid SG 126 may be used as a "3D-texture domain," to paint faulted horizons H(t) 130 in G space 104 with seismic properties, the coordinates $(x,y,z)$ of the vertices of the triangular facets of faulted horizons H(t) 130 may be used as "texture-coordinates" referring to the seismic grid 126. That is, seismic property values may be defined at the vertices of the triangular facets of faulted horizons H(t) 130 in G space 104. For example, a user may select a property or property values and select the points (e.g., cell SGC vertices or centers), horizons, or regions of seismic cube grid SG 126 to which those values are assigned. The assigned values are then stored at the texture coordinates. The user may select these points using, e.g., input device 965 of FIG. 9 such as a mouse, trackball, and/or keyboard. User input may alter the visualization of these points or regions, e.g., on a computer screen, such as display 980 of FIG. 9.

To paint flattened horizons H*(t) 132 in G* space 106 with seismic properties, the coordinates {x(u,v,t),y(u,v,t),z(u,v,t)} of the reverse uvt-transform 112 in G space 104 of vertices of the triangular facets of flattened horizons H*(t) 132 in G* space 106 may be used as "texture-coordinates." Seismic cube grid SG* 128 may be used as a "3D-texture domain," to paint flattened horizons H*(t) 132 in G* space 106 with seismic properties. That is, the property values assigned to texture coordinates of seismic cube grid SG 126 in G space 104 may be assigned to corresponding texture coordinates of flattened seismic cube grid SG* 128 in G* space 106.

Representations of faulted horizons H(t) 130 and/or seismic cube grid SG 126 in G space 104 and/or flattened horizons H*(t) 132 and/or seismic cube grid SG* 128 in G* space 106 may be displayed to a user on a monitor, e.g., display 980 of FIG. 9.

Although the above describes first painting properties on horizons in G space 104 and then transforming those properties to G* space 106 using the forward uvt-transformation 100, embodiments of the invention may similarly include first painting properties on horizons in G* space 106 and then transforming those properties to G space 104 using the reverse uvt-transformation 112.

Painting or assigning property values to vertices, cells or facets changes the data associated with modeled points. For example, when a coordinate (x,y,z) is painted with a property p0, the coordinate is transformed to (x,y,z,p0). Thus, the physical data of a geophysical subsurface structure, e.g., a particle of sediment, represented by the painted coordinates is altered.

10) STOP

In some embodiments, vertices of each cell 116 of grid GG 120 may store both (x,y,z) coordinates and (u,v,t) coordinates. Accordingly, cells 116 of grid GG 120 may be simultaneously defined in G space 104 by their (x,y,z) coordinates and in G* space 106 by their (u,v,t) coordinates, i.e., the uvt-transformation of their (x,y,z) coordinates.

In FIG. 5, due to the discontinuities across faults 109 of seismic cube grid SG 126 and the discontinuous uvt-transformation 100 required to remove those faults, the image of the (e.g., cubic) shaped seismic cube grid SG 126, i.e., flattened seismic cube grid SG* 128, may be deformed (e.g., to not be a cube shape). This may result from the property that IPG-lines described herein may be non-vertical lines and are discontinuous across faults 109. An advantage of such embodiments over conventional mechanisms, is that flattened seismic cube grid SG* 128 may be accurately modeled, (without holes or duplicate points) even in the presence of non-vertical faults (normal or reverse faults) crossing in the vertical direction.

Furthermore, seismic cube grid SG 126 may be coherent with the GeoChron model such that, for example, for each geological-time (t), seismic property values may be approximately constant along the corresponding faulted horizon H(t) 130 in G space 104 and, similarly, along the corresponding flattened horizon H*(t) 132 in G* space 106. When seismic property values are not constant in a region of faulted horizon H(t) 130 or its image, flattened horizon H*(t) 132, the following cases may be considered:

1. In a first case, the original GeoChron model 108 stored using grid GG 120 may be locally inconsistent with the seismic cube grid SG 126 generated therefrom. In such a case, the local region where such inconsistencies occur may be marked as a region of error, for example, denoted by EH(t) in G space 104 and EH*(t) in G* space 106 and may require locally changing or updating the uvt-transformation 100.

2. In a second case, the non-constant seismic property values may represent a real situation in which a horizon has geometric continuity (i.e., it is not cut or folded by faults, erosion or other geometric changes) but the horizon has discontinuities in properties (e.g., sedimentary structures deposited at the same geological-time (t) have different properties). Examples of such sedimentary structures or "geobodies" include channels, lenses and dunes, which are locally discontinuous in property values but not in geometry. In such a case, the non-constant behavior of the seismic properties is accurate and should not be locally changed in these geobodies.

Geological-Time-Volume

Among the many seismic properties which may be derived from seismic amplitudes in a seismic cube grid SG, the property referred to as "unwrapped-instantaneous-phase" may attempt to model geological time. For each vertical seismic-trace corresponding to a given pair {xi,yj} of in-line and cross-line coordinates, the 1D seismic-amplitude function A(z|xi,yj) may be transformed into a new 1D function, IP(z|xi,yj), referred to as the "instantaneous phase" function. The instantaneous phase function, IP(z|xi,yj), may vary, e.g., periodically, with (z). Using "unwrapping" methods known in the art, the instantaneous phase function, IP(z|xi,yj), may be transformed to a non-periodic monotonic function UIP(z|xi,yj). The unwrapped instantaneous phase function may be may attempt to model a geologic-time function. The values of the geological-time function (i.e., the unwrapped instantaneous phase function UIP(z|xi,yj)) may be sampled and stored in the cells of the same seismic cube grid SG containing the seismic amplitude. A seismic cube grid SG storing geological-time values for the cells may be referred to as a "Geological-Time-Volume" (GTV). However, the geological-time-volume generated using the unwrapped instantaneous phase function has many limitations, as described herein.

GeoChron Model Versus Geological-Time-Volume

For the sake of clarity, differences and similarities between embodiments of the invention, e.g., using the GeoChron model and conventional mechanisms using the geological-time-volume (GTV) are described.

Computation of geological time:

In the GTV approach, geological-time is deduced directly from the seismic amplitudes. Therefore, a seismic cube grid SG must be given as input data to compute the geological time. The geological-time is identified with an unwrapped seismic phase and is computed in 1D along seismic traces. It may be appreciated that discontinuities (e.g., faults and unconformities) are not modeled beforehand and are generally deduced from the GTV.

According to embodiments of the inventions, e.g., in the GeoChron approach, geological-time of a 3D model may be interpolated in 3D for example as a piecewise continuous function. To generate the geological-time, sampling points, e.g., irregularly sampled sets of points {SH(t1), . . . ,SH(tn)}, may be used as input data and arbitrary increasing geological times may be assigned thereto. These sets of sampling points may be extracted from seismic cubes, e.g., using auto-picking mechanisms and/or may be points at the intersection of well paths and horizons referred to as "well-markers". When sampling points only include well-markers, geological-times may be computed independently of seismic data, but using discontinuity data (e.g., data associated with faults and unconformities). With the GTV approach, well markers corresponding to the crossing of well curves with horizons typically cannot be taken into account.

In contrast with the geological times used in the GTV approach, embodiments of the present invention based on the uvt-transformation typically do not directly use or even may not use at all seismic cube data to generate geological times, while the GTV model does. However, when seismic data is not used, embodiments of the present invention may use fault data, while the GTV model typically does not.

Furthermore, the GTV approach relies on the unwrapped-instantaneous-phase technique and on 1D interpolations in the vertical direction while embodiments of the present invention may use a full 3D interpolation mechanism, such as, for example, a Discrete-Smooth-Interpolation (DSI) mechanism.

Storage of the geological-time:

In the GTV approach, similarly to the seismic amplitude values, geological-time values are stored in each cell of the seismic cube grid SG. Seismic cube grids SG typically include regular structured 3D cells with the same cubic shape and size. Such seismic cube grids SG typically contain tens of millions of cells and may contain as many as hundreds of millions of cells. Accordingly, tens to hundreds of millions of geological time values may be stored in the GVT approach, imposing a great computational burden for the storage and usage of the geological-time data.

In contrast, in embodiments of the present invention, geological-time values may be stored at the vertices of an unstructured grid GG having polyhedral cells that may vary in shape and size, where the edges do not cut discontinuities (e.g., faults and unconformities). Generally, only a few hundreds of thousands of cells and geological time values (e.g., associated with the vertices of these cells) may be used to generate an accurate geological-time model.

Accordingly, compared to the GTV approach, embodiments of the present invention use significantly less storage space for geological-time data, e.g., storing a factor of a hundred to a thousand times fewer geological-time values.

Extracted horizon:

In the GTV approach, a horizon includes a set of points located along a seismic trace that have the same geological time (t). For each seismic-trace whose cells have the same (x,y) coordinates, a 1D search is used to retrieve the one or more cells with the same geological-time (t). The horizon corresponding to the geological time (t) includes a set of points SH(t) whose projections on the (x,y) plane is a regular 2D array. The number of such points in SH(t) is proportional to the size or number of cells of the seismic cube grid SG in the (x) and (y) directions.

According to embodiments of the invention, e.g., in the GeoChron approach, for each given geological-time (t), a corresponding horizon H(t) includes a set of, e.g., triangular, facets extracted in 3D from the irregular grid GG (e.g., using a known marching-tetrahedra method). The number of triangular facets of a horizon H(t) may be proportional to the number of cells of the irregular grid GG, e.g., only a few hundreds of thousands of cells.

For storing a horizon, the GTV approach uses a number of data points corresponding to the number of cells in the seismic cube grid SG (e.g., tens of millions), while embodiments of the invention may use a number of data points corresponding to the number of cells in an irregular grid GG (e.g., thousands). Therefore, compared to the GTV approach, embodiments of the present invention use significantly less space for storing horizons.

Furthermore, in the GTV approach, a horizon is modeled by a set of points, while in embodiments of the invention, e.g., in the GeoChron approach, a horizon is modeled by a set of polygons, e.g., triangles. Each polygon may be a local approximation of a mean value surface that connects a set of points therein. Representing a horizon by polygons instead of points allows a surface to be modeled using fewer points (e.g., when a triangle is used, the coordinates of the three vertices may be sufficient to fully-define the geometry of the triangle regardless of size). A more compact representation may be achieved using polygons as opposed to points.

Flattening a seismic cube:

In the GTV approach, since IPG lines extend only in the vertical direction, flattening a seismic cube may also be restricted to moving the cells of the seismic cube grid SG in the vertical direction. Since faults in the subsurface are predominantly non-vertical, a strictly vertical motion cannot generate an accurate reversal of the faults required to generate an accurate depositional model.

According to embodiments of the invention, e.g., in the GeoChron approach, a seismic cube may be flattened according to a uvt-transformation or another global geological-time transformation, in which cells of the seismic cube grid SG may be moved in all of the 3D directions along the curvilinear IPG-lines.

In conclusion, although similar names, for example, "geological-time" or "horizons", are used to refer to structures in the GTV approach and in embodiments of the present invention, these structures are quite different. In practice, geological-time values in the GTV approach and in embodiments of the present invention have different values. In some cases, the output of GTV approach may be considered as input for building a uvt-transformation:

a) The set of points {SH(t1), . . . , SH(tn)} corresponding to the horizons of the GTV approach may be used as input data in the GeoChron to interpolate the (GeoChron)-geological-time in 3D.

b) The discontinuities corresponding to faults and unconformities may be directly extracted from a GTV and then used as input by the GeoChron model to interpolate in 3D the (GeoChron)-geological-time.

While the GTV model is imperfect, embodiments of the invention may be used in combination therewith.

For simplicity and clarity of illustration, embodiments of the invention are described in two sections (elements from each may of course be combined in some embodiments).

The first section, entitled "Incremental construction of a GeoChron model from a seismic-cube", describes mechanisms which may be used according to embodiments of the present invention to incrementally define and alter or update the present day model and depositional model, for example, by locally changing the functions u(x,y,z), v(x,y,z), and t(x,y,z) that define the uvt-transformation. A user may control the incremental change using an interactive user interface.

The second section, entitled "Extraction of geo-bodies from a seismic-cube and a GeoChron model" describes mechanisms which may be used according to embodiments of the present invention to alter the present day model and depositional model, simultaneously, by adding or changing geophysical properties assigned to the model. In one embodiment, geobodies may be identified and used to build a property model associated with the present day and depositional models.

Incremental Construction of a Dual Model Relating a Present Day Structures and Past Depositional Structures Incremental Construction of a Dual Model from a Seismic Cube Processor 940 of FIG. 9 may determine or receive an indication of, e.g., from a user operating an input device, points to be edited, altered or removed from faulted horizon 130 in G space 104 or flattened horizon 132 in G* space 106. For example, faulted or flattened horizon 130 or 132 may be displayed on display 980, which a user may inspect to select or mark points in one of the horizons to be edited, e.g., using input device 965. Processor 940 may edit the marked horizon and may automatically, and preferably simultaneously may edit the other un-marked horizon in a corresponding manner.

As described in the section entitled, "The GeoChron Model and Seismic-Cubes":
  in step 3 of one example process, to generate the paleogeographic coordinates (u,v,t), input data may include sets of sampling points {SH(t1), . . . ,SH(tn)} located on reference horizons {H(t1), . . . ,H(tn)} and extracted from a seismic cube grid SG 126; and
  The image of a faulted or folded horizon 130 of seismic cube grid SG 126 in G space 104 under uvt-transformation 100 may be a flattened horizon 132 of flattened seismic cube grid SG* 128 in G* space 106 such that flattened horizon 132 may be flat (e.g., having a constant value range in the geological-time axis t) and any faults 109 intersecting faulted horizon 130 are removed (e.g., as shown in FIGS. 1, 5, 7, and 8).

Figure 4:
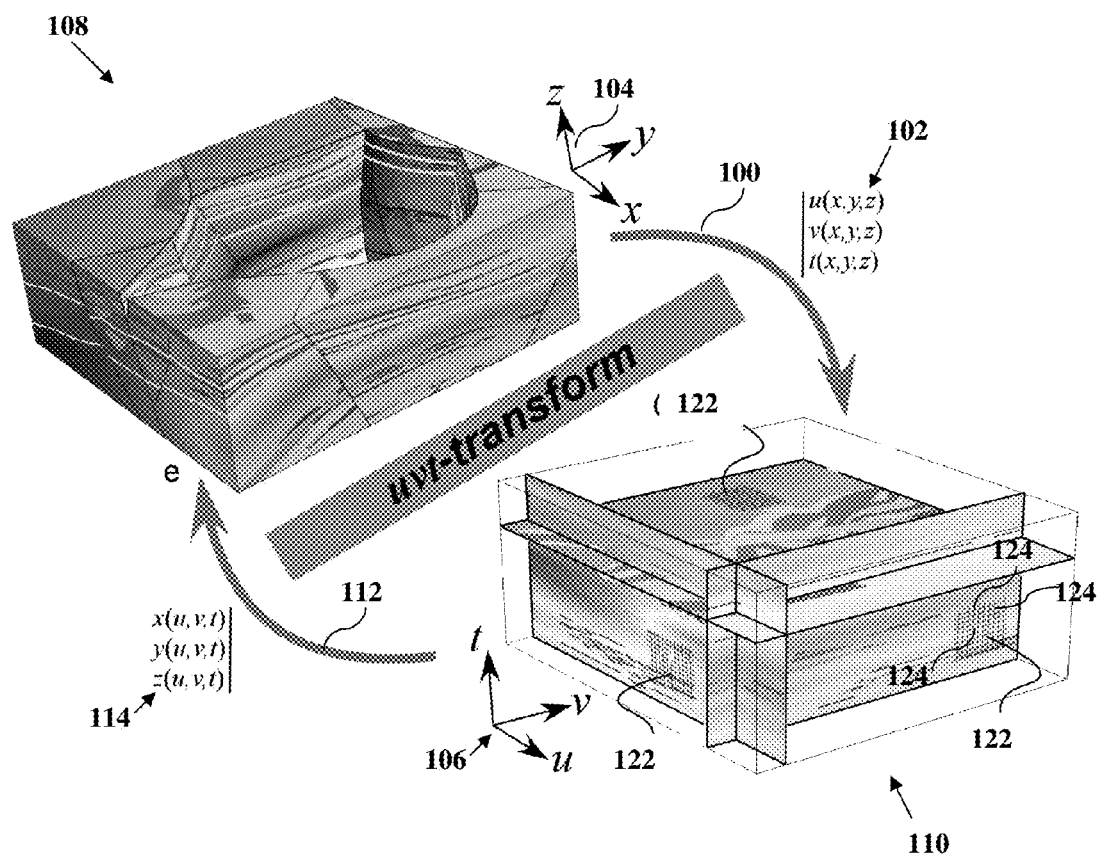
FIG. 4 is a schematic illustration of the present day and past depositional models of FIG. 1, to which geological property values are assigned according to an embodiment of the invention.
Figure 8:
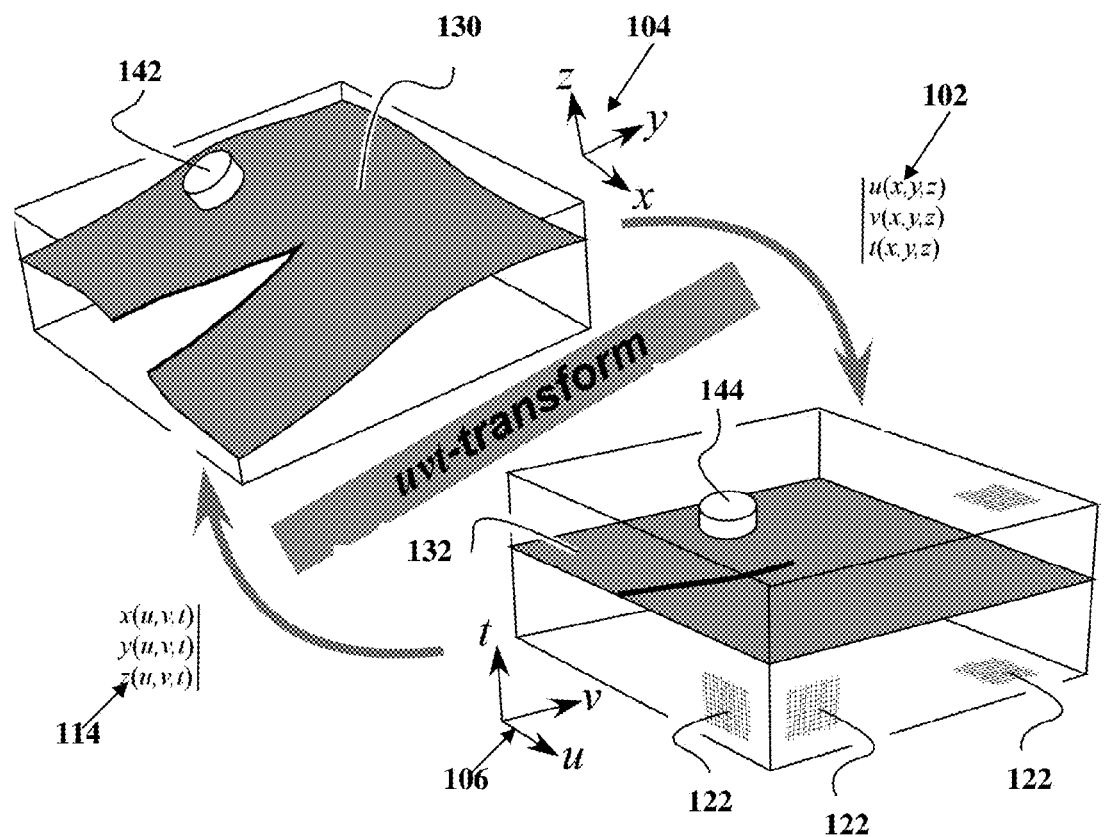
FIG. 8 is a schematic illustration of visualizations of a geobody painter editing tool displayed in two separate views on horizons of the faulted and flattened seismic cubes of FIG. 5, respectively, according to an embodiment of the invention.

Using these features, embodiments of the invention provide a mechanism to incrementally generate models, for example, a dual model such as the GeoChron model, as follows. This process (and others herein) may be for example carried out by a processor executing code or software instructions, e.g. the system 905 shown in FIG. 9:
  1) A network of faults F(t) (e.g., faults 109 of FIG. 1) may be modeled.
  2) A 3D geological domain in G space 104 may be covered by a mesh, lattice or grid GG 120 including adjacent 3D polyhedral cells 116, e.g., as shown in FIG. 3. Polyhedral cells 116 may be, for example, tetrahedral shaped (as in FIG. 3) or hexahedral shaped, or may be other suitable shapes. The edges of cells 116 may be tangent to the surfaces of faults 109 but do not cross these fault surfaces. The geometry of each cell 116 of grid GG 120 may be defined by the (x,y,z) coordinates at the vertices of that cell. Since a uvt-transformation 100 eliminates faults 109 in the depositional model 110 in G* space 106, the transform functions u(x,y,z), v(x,y,z) and t(x,y,z) may be discontinuous across faults 109. To generate these discontinuity, grid GG 120 used to model these functions may itself be discontinuous across faults, for example as follows:
  Edges of cells 116 in grid GG 120 may be tangent to fault surfaces but do not cross these fault surfaces.
  Collocated vertices of adjacent cells 116 on both sides of a fault 109 may be duplicated to store distinct location values for each cell 116, e.g., attached at the vertices thereof. Accordingly, discontinuities of geometric and seismic property functions may be accurately modeled across faults 109.
  3) The 3D geological domain in G space 104 may also be covered by a seismic-cube grid SG 126, for example, as shown in FIG. 5. Seismic cube grid SG 126 may be a fine regular mesh including adjacent 3D polyhedral, preferably hexahedral cells. Each cell may store for example seismic amplitude data collected from seismic signals and seismic properties derived therefrom.
  4) A 3D geological domain in G* space 106 may be covered by a mesh, lattice or grid GG* 122. Grid GG* 122 may store seismic and/or geological property values and therefore may be referred to as a "property model." Property grid GG* 122 may include adjacent 3D polyhedral cells 124 preferably having a hexahedral shape (e.g., as shown in FIGS. 4 and 8). Cells 124 may have a resolution or size sufficiently to detail the variations of the seismic and/or geological properties throughout the depositional model 110. A user may paint or assign property values to model 110, e.g., using an input device such as a mouse and/or keyboard, which are defined at the cells of property grid GG* 122. Using the reverse uvt-transformation 112 the new property values may be automatically assigned to the corresponding cells of seismic property grid GG 120 in G space 104 and displayed on model 108 (e.g., as shown in FIG. 3).
  5) Select an initial subset of reference horizons RH={H (t1), . . . ,H(tn)} in G space 104. Any reference horizons may be used, for example, the most visible and simple to interpret horizons in the seismic cube grid SG 126 as determined by a user. The number, n, of reference horizons in the initial subset may be small. For example, two reference horizons may be selected, e.g., located in the neighborhood of the bottom and top parts of the 3D geological domain in G space 104.
  6) For each horizon H(ti) of the selected subset of reference horizons RH, a user may select "seed points" SP(ti)={p1,p2, . . . } on the horizon in G space 104. The points may be selected from a corresponding vertical cross sections of seismic cube grid SG 126 in G space 104. For example, the user may click or press a button or key on a mouse (or any other input device) to select these points.
  7) For each horizon H(ti) of the selected subset of reference horizons RH, use the seed points SP(ti) to extract a subset SH(ti) of sampling points located on the horizon in G space 104. If well markers corresponding to the intersections of well curves with H(ti) are given, then these well markers may be added to SH(ti).
  8) Define SH to be the set of all the subsets of extracted sampling points, for example, as follows:

$$SH=\{SH(t1), \ldots, SH(t_n)\}.$$

9) Using input data SH, compute the geological-time function t(x,y,z) of the GeoChron model, e.g., according to a mechanism known in the art, and such that the geological-time function t(x,y,z) is approximately equal to (ti) for any location (x,y,z) of a sampling point in SH(ti).
10) Using the geological-time function t(x,y,z), compute the paleo-geographic coordinate functions u(x,y,z) and v(x,y,z), e.g., according to a mechanism known in the art. Accordingly, since the geological-time function t(x,y,z) and the paleo-geographic coordinate functions u(x,y,z) and v(x,y,z) are now defined, the uvt transformation 100 is defined.
11) Using the uvt-transformation, a flattened seismic cube grid SG* 128 in G* space 106 may be generated as the image of seismic cube grid SG 126 in G space 104 under the uvt-transformation 100 (e.g., as shown in FIG. 5).
12) Initialize a region QC* to be an empty subset of G* space 106. The region QC* may include a subset of points of model 110 and may be a local region of the geological domain in G* space 106 where the GeoChron model may be locally altered, updated or changed.
13) Control the quality of the GeoChron model by adding regions of the G* space 106 to the empty set QC* where the GeoChron model is to be improved or updated, for example, as follows:
    (a) Control the visual quality of cross-sections of flattened seismic cube grid SG* 128 in G* space 106. For example, for each vertical cross-section of the flattened seismic cube grid SG* 128 in G* space 106: If the GeoChron model is accurate, then, local irregularities or heterogeneities induced for example by sedimentary structures such as lenses, channels or dunes, are accepted then the extrema of the seismic property values on these cross sections should appear to be horizontally aligned. Otherwise, if there are regions in G* space 106 of these cross sections where the extrema of the seismic property values are not horizontally aligned, e.g., as determined by visual inspection by a user, then the user may select these regions to be added to QC*. For example, individual points, lines, triangles, polygons, polyhedra or other surfaces may be added to the region QC*.
    (b) Control the visual quality of the flattened horizons H*(ti) 132 at geological-times (ti) of flattened seismic cube grid SG* 128 in G* space 106. For example, for each flattened horizon H*(ti) 132 of the flattened seismic cube grid SG* 128 in G* space 106: If the GeoChron model is accurate, then the seismic property values in seismic cube grid SG* 128 are approximately constant for each flattened horizon 132. Otherwise, if there are regions of the flattened horizons H*(ti) 132 where the seismic property values are not approximately constant, e.g., as determined by visual inspection by a user, then the user may select these regions or subset of points to be added to QC*.
    (c) Control the numerical quality of cross-sections and/or horizons H*(ti) 132 at geological-times (ti) of flattened seismic cube grid SG* 128 in G* space 106. A user or programmer may select a standard deviation threshold to be programmed in a computing device. For example, for each cross-section and/or flattened horizon H*(ti) 132 of flattened seismic cube grid SG* 128 in G* space 106: the computing device may determine the standard deviation threshold of the seismic property values thereof. If the GeoChron model is accurate, then the standard deviations for each cross-section and/or flattened horizon H*(t) may be approximately zero. Otherwise, if the standard deviation threshold is greater than or equal to the programmed standard deviation threshold in one or more regions or points of the cross-sections and/or flattened horizons H*(t) 132, add these regions or points, e.g., or any region of GG* where the standard deviation is above the programmed threshold, to QC*.
14) If QC* is not an empty set, then:
    (a) The inverse uvt-transformation QC of the region QC* may be computed and then all extracted sampling points SH contained in QC may be removed from SH.
    (b) A series of "seed points" SP*(tnew)={p*1,p*2, ... } in G* space 106 may be selected which are located at the intersection of QC* with a horizon H*(tnew), e.g., selected by a user. For example, the user may select the seed points by clicking (e.g., pressing or clicking on an input device which controls an on-screen cursor, indicator, button or other tool) on the visualization of the points in G* space 106 or their reverse uvt-transformation points in G space 104 using a mouse or another input device.
    (c) A series of seed points SP(tnew)={p1,p2, ... } located in G space 104 may be generated by transforming the series of seed points SP*(tnew)={p*1, p*2, ... } in G* space 106 using the current reverse uvt-transformation 112. That is, for each point p* of the series of seed points SP*(tnew) in G* space 106, the point p of the series of seed points SP(tnew) in G space 104 is the reverse uvt-transformation of the point p*.
    (d) A subset SH(tnew) of sampling points located on the horizon H(tnew) may be automatically extracted using the series of seed points SP(tnew) in G space 104 and the current geological-time function t(x,y,z). For example, the sampling points may be extracted according to the series of operations described in the section entitled, "Using the geological-time function t(x,y,z) to extract sampling points on horizons."
    (e) The subset SH(tnew) of sampling points located on the horizon H(tnew) may be added to the set of all extracted sampling points SH and the corresponding horizon H(tnew) may be added to the set of reference horizons RH.
    (f) Repeat steps (14.*b*) to (14.*e*) using a new value (tnew) of the geological-time function corresponding to a horizon H*(tnew) visible in the set QC*.
    (g) Proceed to step (9) to update and locally change the geological-time function t(x,y,z) to include local changes of the new set of sampling points. The process may proceed to step (10) to generate the corresponding locally edited paleo-geographic coordinate functions u(x,y,z) and v(x,y,z). Together the independently locally edited functions u(x,y,z), v(x,y,z), and t(x,y,z), form the 3D uvt-transformation locally edited in three dimensions. Steps (9)-(14) may be iteratively repeated, for example, to incrementally generate a new locally edited version of the uvt-transformation.

15) STOP

Other operations or series of operations may be used.

It may be noted, at step 14-g of the above process, returning to step (9) allows an incremental construction of a dual model from data stored in seismic cubes (e.g., in seismic cube grid SG 126 in G space 104 or flattened seismic cube grid SG* 128 in G* space 106).

An error in the GeoChron model may exist for example when a point in G space 104 is assigned the wrong geological-time (t) and is thereby mapped to the wrong horizon H*(t) in G* space 106 using uvt-transformation 100. Since seismic-property values are ideally constant on horizons in G space 104 and horizontal cross sections in G* space 106, such an erroneous point may be detected, for example, by a user inspecting a visualization of the property values of flattened seismic cube grid SG* 128 in G* space 106 to identify any stray points deviating from the ideally constant property values or by a computing device identifying any greater than threshold standard deviations across the horizons or horizontal cross sections. Since geobody structures cause discontinuities in seismic property values that are accurate, any deviations in seismic property values attributed to geobodies are not erroneous and may therefore be ignored when correcting the model. A processor 940 of FIG. 9 may receive the user selected points to be edited, altered or removed, e.g., via commands from user input device 965 of FIG. 9, mouse click commands (or other suitable input) indicating the undesired points.

Alternatively, a processor, e.g., processor 940 of FIG. 9, may automatically identify any problematic points or points to be changed by measuring the standard deviation of property values on horizons in G space 104 or horizontal cross sections in G* space 106. When the processor measures standard deviation values for a property that is greater than a predetermined threshold in a local region (e.g., a neighborhood of a point), the processor may automatically identify the deviating point or points and may select the point to be changed and corrected.

Once the sampling points to be changed are identified, in some embodiments, a new point may be selected to replace the changed point. Accordingly, in one embodiment, a new seed point may be selected that is located in the neighborhood of the erroneous point and a correct flattened horizon 132. The new point may be selected that has seismic property values consistent with those throughout the correct flattened horizon 132 (e.g., with a standard deviation of approximately zero) to ensure that the new point is not itself an erroneous point. Correct flattened horizon 132 may be a pre-existing horizon or may be generated, e.g., using an auto-picking mechanism. A corresponding new sampling point may be generated in G space 104. The new sampling point in G space 104 may be the reverse uvt-transformation 112 of the new sampling point in G* space 106.

Faulted and folded horizon 130 and flattened horizon 132 may be altered such that the erroneous points of depositional model 110 may be replaced in G* space 106 with a new point located on a flattened horizon 132, e.g., selected by a user, and the point corresponding to the reverse uvt-transformation 112 of the erroneous point in present day model 108 may be replaced in G space 104 with the point located on the faulted horizon 130 corresponding to the reverse uvt-transformation 112 of the new point located on a flattened horizon 132, e.g., determined automatically by a processor. Other additional points may also be added to G space 104 and/or G* space 106 in a neighborhood or seismic window of the new points, as described in the section entitled, "Using the geological-time function t(x,y,z) to extract sampling points on horizons".

To alter, update or locally change the GeoChron model accordingly, uvt-transformation 100 may be locally changed or refined to take into account the removal of the erroneous points QC* in G* space 106 and their corresponding points QC in G space 104 and to take into account new sampling points in G* space 106 and their corresponding points in G space 104. For example, to refine the GeoChron model, uvt-transformation 100 may be globally left unchanged, but may be locally changed, to replace the points of error with new corrected points. For example, the uvt-transformation 100 may be locally updated or changed by re-interpolating the uvt-transformation 100 using added, deleted, or moved sampling points as local constraints in a DSI Interpolation method.

In some embodiments, changing the global transformation for the subset of points to a "local transformation" locally changes or edits the global transformation at those points (e.g., and in the neighborhood of those points to generate a smooth local function).

In an embodiment of the invention, a computing system or processor may model a subsurface structure at a time period when the structure was originally formed. A memory or other device may store a first model having a plurality of non-planar horizons representing a current state of the subsurface structure. One or more processors may compute a non-uniform vector field, e.g. $\{u(x,y,z), v(x,y,z), t(x,y,z)\}$, based on the non-planar geometry of the horizons of the first model. Using the non-uniform vector field, e.g., a three-dimensional (3D) vector field, the processor may transform geographic coordinates (x,y,z) of the first model to depositional coordinates of a second model (u,v,t) representing a predicted or possible state of the subsurface structure at a past geological time when the subsurface structure was originally deposited: such a transformation may be referred to as a uvt-transformation or a uvt-transform. A user or auto-picking algorithm may select a finite set of sampling points in the first model associated with the same horizon $H(t_i)$ in the second model. A set of points associated with the same horizon $H(t_i)$ in the past depositional model may have the same geological time $(t_i)$ of deposition. The processor may flatten these points associated with the same horizon from a non-planar subset of points in the first model to a horizontal plane or level set in the second depositional model, e.g., associated with a constant value of the geological time (t). The processor may generate corresponding paleo-geographic coordinates (u,v) for each point so that the uvt-transformation minimizes the deformation of the subsurface structure from the past depositional model to the current model. The uvt-transformation may define each of the paleo-geographic coordinates (u,v) to be least squares solutions to a plurality of deformation equations. The geological time coordinate (t) may contribute a one-dimensional transformation to the (x,y,z) points of the present day model and the paleo-geographic coordinates (u,v) may contribute an additional two-dimensional transformation to the (x,y,z) points of the present day model, generating a total of three-dimensional (3D) uvt-transformation between the 3D present day model 108 and 3D depositional model 110. That is, each point (u,v,t) of G* space 106 not belonging to an eroded region may be transformed into a point (x,y,z) of G space 104 with three degrees of freedom (e.g., where at least some points are moved in a direction that is the vector sum of three respectively perpendicular directions).

The forward uvt transformation 100 may map a finite set of (x,y,z) points in the present day model 108 to a finite set of (u,v,t) points in the depositional model 110 (e.g., using a one-to-one correspondence). The finite sets of points in the present day model 108 may be, for example, defined as the set of nodes of a 3D mesh or grid 120 or at other points, such as the vertices or center points of voxels composing a 3D grid in G space 104. Inside each cell 116 of the 3D grid 120 in G space 104, the processor may then locally interpolate the transformation "between the nodes" to transform any point (x,y,z) in G space 104 into a point (u,v,t) in G* space 106 using the forward uvt transformation 100 and any point (u,v,t) in G* space 106 to any point (x,y,z) in G space 104 using the reverse uvt transformation 112.

When a change in either the past depositional model 110 or the current model 108 is made, the current uvt-transformation 100 or 112 may no longer minimize the deformations of the terrains between the past depositional model and the present day model. The processor may then re-compute or re-interpolate the uvt-transformation between the current and depositional models to generate an updated uvt-transformation that incorporates the local changes (e.g., the moved, deleted, added points in either model), while still minimizing the deformations of the terrains between the models. The re-computation may locally or globally change or update the initial uvt-transformation to incorporate new or changed positions of new or changed sampling points, e.g., so that locally changed points in the current model associated with the same depositional horizon are continuously transformed to the same planar depositional horizon of the depositional model with no gaps and no overlaps.

These local changes represent deformations of pieces of sediment that over time have moved in a path with a greater than minimal deformation. Although less likely, such deformations do occur in nature and may be recognized by a user and entered manually to locally change the automated model which otherwise automatically generates minimal deformations.

Paleo-geographic coordinates, e.g., u(x,y,z) and v(x,y,z), may be generated according to, for example, embodiments of the invention described in U.S. patent application Ser. No. 12/791,352, issued as U.S. Pat. No. 8,711,140, which is incorporated by reference herein in its entirety. Other methods of generating paleo-geographic coordinates may be used.

Geological time function, e.g., t(x,y,z), may be generated according to, for example, embodiments of the invention described in U.S. patent application Ser. No. 12/791,370, issued as U.S. Pat. No. 8,600,708 which is incorporated by reference herein in its entirety. Other methods of generating a geological-time function may be used.

It is contemplated that modifications and combinations of this series of operations will be readily appreciated by those skilled in the art and are within the spirit and scope of the invention.

Using the Geological-Time Function t(x,y,z) to Extract Sampling Points on Horizons In the series of operations described in the section entitled, "incremental construction of a GeoChron model from a seismic cube," new points in G space 104 may be defined using the reverse uvt transformation to replace erroneous points in G* space 106. However, considering the large volume of data points typically associated with geological models, individually deleting and adding points may be a difficult and laborious task. Accordingly, embodiments of the invention provide a mechanism for automatically extracting a set of new sampling points SH(tnew) in G space 104 for each new point added in G space 104 to locally change the uvt-transformation therebetween.

Figure 6:
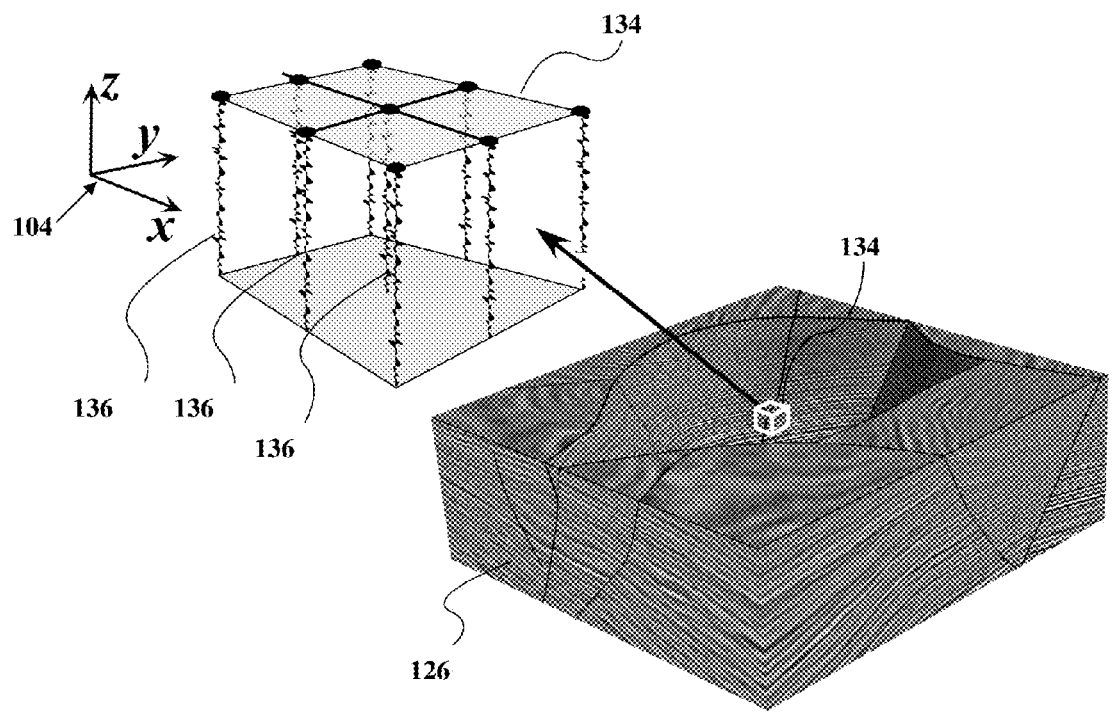
FIG. 6 is a schematic illustration of a 3D seismic window of the faulted seismic cube of FIG. 5 used to automatically generate additional points to add to the present day model according to an embodiment of the invention.

Reference is made to FIG. 6, which schematically illustrates a seismic window W(x,y,z) 134 centered on a new point (x,y,z) of seismic cube grid SG 126 in G space 104 used to automatically generate additional points to add to model 108 according to an embodiment of the invention. Center point (x,y,z) and seismic window W(x,y,z) 134 may be selected by a user, e.g., via input device 965, or automatically, e.g., by processor 940 of FIG. 9. Seismic window W(x,y,z) 134 may be displayed on display 980. Seismic window W(x,y,z) 134 may be, for example, a small 3D hexahedral box centered at a point (x,y,z) in the seismic cube grid SG 126 and corresponding to the seismic signal along one or more vertical traces 136 of a seismic property. Vertical traces 136 may for example intersect the (x,y) plane with vertical coordinates (e.g., representing altitude or seismic-time) in a range of [z-T1,z+T2], where T1 and T2 may be automatically determined or selected by a user. For example, if (z) represents seismic-time, then T1=T2=30 milliseconds. Other time values may be used.

The point (x,y,z) may be a newly added point generated in step 14(c) of the section entitled "incremental construction of a GeoChron model from a seismic cube." The set of new sampling points SH(tnew) in step 14(d) of the section entitled "incremental construction of a GeoChron model from a seismic cube" may be generated, for example, as follows:

In a first embodiment, for a given seed point or a sampling point (s0) extracted, e.g., by a user, from H(tnew) having coordinates (x0,y0,z0) in the G space 104, a new sampling point (s) may be selected, e.g., by a user via user input device 965 of FIG. 9, in the neighborhood of (s0) to be added to SH(tnew), for example, as follows:

1. Intervals or step sizes sx and sy may be selected in the x and y directions, respectively, of seismic cube grid SG 126.
2. A point (q) neighboring (s0) with coordinates (x0+sx, y0+sy,z0) may be selected, e.g., by a user via user input device 965 of FIG. 9.
3. Seismic windows W(x0,y0,z0) and W(x0+sx, y0+sy, z0) may be extracted from the seismic cube grid SG 126, e.g., automatically by processor 940 of FIG. 9.
4. The seismic window W(x0,y0,z0) of point s0 may be compared to the seismic window W(x0+sx, y0+sy, z0) of point (q) to determine the optimal value of (dz) such that (s) with coordinates (x0+sx,y0+sy,z0+dz) best correlates with (s0), e.g., determined by processor 940 of FIG. 9, according to a correlation function. For example, a correlation function may be a mathematical function comparing the values stored in seismic windows W(x0,y0,z0) and W(x0+sx, y0+sy, z0) to determine one or more points (x0+sx,y0+sy,z0) therein having a minimum difference in seismic property values, location or other parameters from the center point (x0,y0,z0).
5. Add (s) to the refined set of sampling points SH(tnew).
6. STOP Other operations or series of operations may be used.

In a second embodiment, for a given seed point or a sampling point (s0) extracted from SH(tnew) having coordinates (x0,y0,z0) in the G space 104, a new sampling point (s) may be selected, e.g., in the neighborhood of (s0) to be added to SH(tnew), taking into account the current geological-time function t(x,y,z), for example, as follows:

1. Intervals or step sizes sx and sy may be selected in the x and y directions, respectively, of seismic cube grid SG 126.

2. A value (znew) may be determined so that t(x0+sx, y0+sy, znew) is equal to (tnew).
3. Seismic windows W(x0,y0,z0) and W(x0+sx, y0+sy, znew) may be extracted from the seismic cube grid SG 126.
4. The seismic window W(x0,y0,z0) of point s0 may be compared to the seismic window W(x0+sx, y0+sy, znew) to determine the optimal value of (dz) such that the point (s) with coordinates (x0+sx,y0+sy,znew+dz) best correlates with (s0).
5. Add (s) to the refined set of sampling points SH(tnew).
6. STOP Other operations or series of operations may be used. An auto-picking mechanism may automatically select points that correlate with the new points based on a correlation function, e.g., minimizing a standard deviation of property values. Additional sampling points added in G space 104 may be located in a neighborhood, e.g., a seismic window, of some or all point(s) newly added in step 14(c) of the section entitled "incremental construction of a GeoChron model from a seismic cube."

In the first embodiment, the neighborhood or a seismic window for picking points may be generated based on the position of vertical traces 136 and the range of the vertical coordinate (z), e.g., [z-T1,z+T2] in the example above. It may be noted that, in G space 104, the vertical coordinate (z) may for example represent seismic altitude or seismic-time, but does not represent the geological-time t(x,y,z). A seismic signal may represent a record of a seismic wavelet along a seismic-time at a given location. Since a seismic wavelet takes more time to travel the deeper it goes below the subsurface, seismic-time may correspond to the depth of subsurface geologic structures.

In the second embodiment, the neighborhood or a seismic window for picking sampling points on a horizon may be generated based on the geological-time t(x,y,z) (e.g., see steps 2. and 3.). Since the geological-time function t(x,y,z) is discontinuous across faults, e.g., jumping across faults to link geometrically disconnected points on both sides of a fault, a seismic window generated using the geological-time function t(x,y,z) allows the window to "jump" or extend across fault as well. Accordingly, if points (s) and (s0) are on opposite sides of a fault, point (s) may still be in the window of point (s0) if they have a similar geological-time (t). Thus, points (s) across a fault may be correctly linked and correlated with point (s0) when they meet a sufficient correlation, e.g., having similar seismic property values. When such an auto-picking mechanism is used to generate horizons, the horizons formed at the same geological-time (t) will extend across faults to generate a more accurate model. In contrast, in the first embodiment, horizons may only be accurately formed by points (s) surrounding point (s0) that are not separated by a fault.

Although embodiments herein may describe automatically adding points in G space 104 using a seed point (x,y,z), it may be appreciated that an equivalent mechanism may be used to automatically add points in G* space 106 using a seed point (u,v,t) in the flattened seismic cube grid SG* 128 in G* space 106. Additional points added in G* space 106 may be located in a neighborhood, e.g., a seismic window, of each seed point generated in G* space 106.

It is contemplated that modifications and combinations of these operations will readily occur to those skilled in the art, which modifications and combinations will be within the spirit of the invention and the scope of this invention.

Extraction of Geo-Bodies from a Seismic-Cube and a GeoChron Model

Geobodies are structures, e.g., such as a lenses, channel, levees or dune, that may have different physical properties than their surrounding regions and may introduce sedimentological discontinuities, e.g., which are typically different from the structural discontinuities of faults. In the seismic cube grid SG* 128 in G* space 106, compared to their surrounding regions, geobodies are continuous geometrically, but discontinuous with respect to seismic property values. Geobodies resulting from sedimentary events may be distinguished from faults whose discontinuities in seismic property values are a result of tectonic events.

Figure 7:
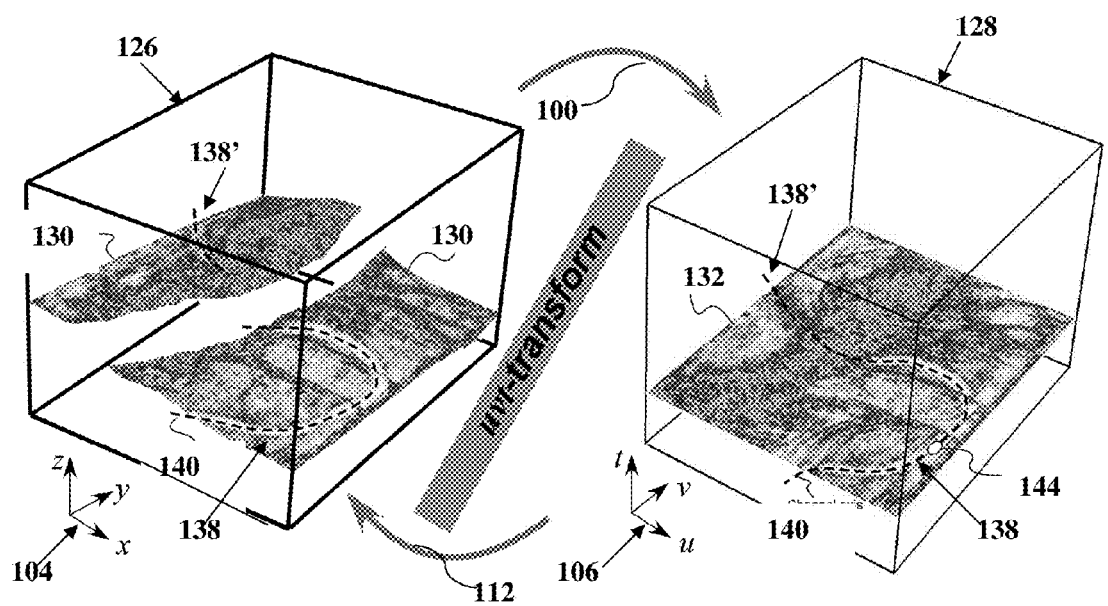
FIG. 7 is a schematic illustration of visualizations of a geobody displayed in two separate views on horizons of faulted and flattened seismic cubes, respectively, according to an embodiment of the invention.

Reference is made to FIG. 7, which illustrates visualizations of faulted horizon H(t) 130 in G space 104 and its uvt-transformation 100 image flattened horizon H*(t) 132 in G* space 106 for any given geological-time (t), according to an embodiment of the invention. The visualization in G space 104 and its image in G* space 106 may be displayed on adjacent windows on a computer screen. The geological-time (t) may be altered or changed to change the corresponding faulted horizon H(t) 130 and flattened horizon H*(t) 132 displayed. The trace of seismic cube grid SG 126 may be displayed onto faulted horizon H(t) 130 and the trace of the image of the flattened seismic cube grid SG*128 may be displayed onto flattened horizon H*(t) 132, e.g., using a 3D texture mapping technique. This allows the seismic properties to be displayed onto faulted or folded horizon H(t) 130 and its image flattened horizon H*(t) 132 and may reveal geobodies 138, for example, representing channels, levees or dunes or other geophysical structures. Geobody 138 may be represented on a single flattened horizon H*(t) 132. Several parts of a faulted or folded horizon H(t) 130 may be needed to visualize the entire geobody 138.

Representations of faulted horizon H(t) 130 in G space 104 and its uvt-transformation 100 image flattened horizon H*(t) 132 in G* space 106 may be displayed to a user on a monitor, e.g., display 980 of FIG. 9.

For example, in FIG. 7, geobody 138 represents a channel, e.g., highlighted in white. A channel is typically a continuous structure extending uninterrupted on a horizon H(t)*132 at its depositional or geological-time (t). A dashed line 140 is drawn along geobody 138 following the curve of geobody 138 on faulted horizon H(t) 130 and flattened horizon H*(t) 132. Since channels are typically continuous, geobody 138 should extend along the entire dashed line 140. However, as shown in both faulted and flattened horizons 130 and 132, geobody 138 is discontinuous and interrupted at regions 138' along the dashed line 140. Accordingly, considering only the visualization of the geobodies on faulted horizon H(t) 130 in G space 104, a user may erroneously assume that interrupted geobody regions 138' and 138 are two distinct geobodies rather than one unique geobody. The visualization in the G* space 106 clearly shows that the geobodies 138 and 138' are connected parts of the same geological structure.

According to embodiments of the invention, there is provided a system and method for altering and correcting property models, e.g., property model grid GG 120 in G space 104 and property model grid GG* 122 in G* space 106. The corrected property models 120 and 122 may then be displayed on corresponding present day model 108 and depositional model 110, respectively, e.g., using texture mapping.

Embodiments of the invention include a new computing tool, e.g., referred to as a "geobody-painter" or "geobody editing tool". The geobody painter or editing tool may be a computing tool for extracting seismic property data associated with geobody structures. The seismic property data may be stored, e.g., numerically, in cells of seismic cube grid 126 covering G space 104 and preferably in cells 124 of property model grid GG* 122 covering G* space 106 (e.g., as shown in FIGS. 4 and 8) where seismic property data is generally uniform (except for geobodies 138) and therefore of a simpler form. The geobody painter may include features, for example, as follows:

The geometry of the geobody painter may be selected or created to include a pair of twin 3D volumes B* in G* space and B in G space, e.g., referred to as a "3D brush" (which also may be marked by the system with, e.g., a marker or cursor) which at any time are simultaneously centered on a point (x,y,z) in G space 104 and its uvt-transformation (u,v,t) in G* space 106.

The geobody painter may be moved, e.g., via user input device 965 of FIG. 9, causing dragging of the center point, onto and across faulted horizon H(t) 130 in G space 104 and its uvt-transformation image flattened horizon H*(t) 132 in G* space 106. When the geobody painter is moved or used in G space 104, a simultaneous and corresponding movement or usage may be executed in G* space 106, and vice versa.

The geobody painter may have "painting" and "erasing" modes in which the seismic property data stored in cells 124 of the property model grid GG* 122 covering G* space 106 may be edited.

Geobody-Painter Definition

Reference is made to FIG. 8, which schematically illustrates visualizations of a geobody painter 3D marker, cursor, editing tool, e.g., including a pair of twin volumes B 142 located in G space 104 and B* 144 located in G* space 106. Twin volumes B 142 and B* 144 may be referred to, for example, as "brushes". The geobody painter or editor twin brushes B 142 and B* 144 may be defined, for example, such that brush B 142 may be the reverse uvt-transformation 112 of brush B* 144. As a consequence, when brush B* 144 crosses the uvt-transformation of a fault in G* space, its reverse uvt-transformation B 142 may include disconnected volumes on both parts of this fault in G space.

Markers, cursors, editing tools, or brushes B 142 and B* 144 may be moveable on-screen graphical (3D) icons, which may be controlled or operated, e.g., by a user via user input device 965 of FIG. 9. Brushes B 142 and B* 144 may be displayed on adjacent windows on a computer screen with corresponding faulted horizon H(t) 130 in G space 104 and flattened horizon H*(t) 132 in G* space 106, respectively. Brushes B 142 and B* 144 may operate, for example, according to one of the following mechanisms:

1. Brushes B 142 and B* 144 may have a prismatic shape (e.g., as shown in FIG. 8, in which a cylindrical prism is used), for example, defined as follows:
    a. In G* space 106, brush B* 144 moving along flattened horizon H*(t) 132 may include:
        i. top and bottom faces located on adjacent horizons H*(t+dt1) and H*(t−dt2), above and below flattened horizon H*(t) 132, respectively, e.g., defined by a closed curve drawn on these adjacent horizons; and
        ii. vertical lateral faces, e.g., a vertically oriented cylinder in FIG. 8.
    b. In G space 104, brush B 142 moving along faulted horizon H(t) 130 is the reverse uvt-transformation of a brush B* 144 defined in G* space 106. Accordingly, brush B 142 may include:
        i. top and bottom faces located on adjacent horizons H(t+dt1) and H(t−dt2), above and below faulted horizon H(t) 130, respectively, e.g., defined by a closed curve drawn on these adjacent horizons;
        ii. lateral faces tangential to the IPG-lines, e.g., a cylinder oriented along an IPG line in FIG. 8.
        iii. If brush B* 144 moves in G* space in an area, the uvt-transformation of which is a fault in G space, then brush B 142 may be split in G space into distinct parts on both sides of this fault.
2. Brushes B 142 and B* 144 may have any suitable shape such as, for example, but not limited to:
    a. a sphere or half a sphere;
    b. an ellipsoid or half an ellipsoid; and
    c. a polyhedron.

The geometry of the geobody painter may be selected or created in G space 104 or G* space 106, for example, as follows:

The closed curve shape of the top and/or bottom faces of brush B 142 or brush B* 144 may include a circle, an ellipse or a polygon, e.g., selected by the user or pre-selected as a default shape. The size and shape of brush B 142 or brush B* 144 may be selected by the user or pre-selected as an initial or default size. The size and shape of brush B 142 or brush B* 144 may be changed, e.g., using dedicated keys on a keyboard, entering a size number or shape model, or using a mouse-wheel or clicking a mouse. For example:

the shape of brush B 142 or brush B* 144 may be selected from a plurality of predefined options, e.g., represented by icons in various shapes of different possible closed curves. The desired shape may be selected, e.g., by clicking (e.g., pressing or clicking on an input device which controls an on-screen cursor, indicator, button or other tool) on the desired icon with a mouse. Alternatively, the shape of brush B 142 or brush B* 144 may be drawn by the user;

the initial size or diameter of brush B 142 or brush B* 144 may be pre-selected, e.g., as a function of the settings of the virtual camera used to view the G space 104 and G* space 106 models. For example, the initial diameter of brush B 142 or brush B* 144 may be set to span a predetermined number (e.g., n=1, 2, . . . ) of points, vertices, facets or cells of property grid GG 120 covering the G space 104 or property grid GG* 122 covering the G* space 106, respectively; and the size or diameter of brush B 142 or brush B* 144 may be changed, e.g., by using dedicated keys or a mouse. For example, the diameter of the closed curve may be increased or decreased by moving the wheel of a mouse forwards and backwards, respectively.

The closed curve shape of the top and/or bottom faces of brush B 142 or brush B* 144 may be drawn on H*(t) and duplicated to define the same shape for the top and bottom faces, may be drawn individually on H*(t), a first time when the user selects a top face drawing field and a second time when the user selects a bottom face drawing field, may be drawn on horizon H*(t+dt1) for the top face and on H*(t−dt2) for the bottom face, or may be drawn in a designated scratch-pad area of a geopainter user interface. The closed curve shape may be drawn free-form or by selecting a plurality of points defining the boarder of the curve. For example, if the close curve is a polygon, the user may define the curve by a series of mouse or other input device clicks on faulted horizon H(t) 130 or its image flattened horizon H*(t) 132.

The heights (dt1) and (dt2) of brush B 142 or brush B* 144 above and below faulted horizon H(t) 130 and flattened horizon H*(t) 132, respectively, may be defined, for example, as follows:

Initial heights (dt1) above and (dt2) below the horizon of brush B 142 or brush B* 144 may be, for example, equal to a vertical step on property grid GG* 122 covering the G* space 106 and/or may be set numerically by typing a size in a dedicated editable field of a geopainter graphical user interface. The initial heights above and below the faulted or flattened horizons 130 and 132 are preferably equal (e.g., dt1=dt2).

The heights (dt1) above and (dt2) below the horizon of brush B 142 or brush B* 144 may be changed. For example, heights (dt1) and (dt2) may be increased or decreased, e.g., interactively by moving a cursor or by pushing dedicated keyboard keys to increase or reduce the heights or by numerically typing a size in a dedicated editable field of a geobody painter graphical user interface.

Alternatively or additionally, the heights (dt1) above and (dt2) below the horizon of brush B 142 or brush B* 144 may be a function of the position of the brush in the studied domain. For example, heights (dt1) and (dt2) of brush B* 144 may vary so that the height of brush B 142 in the direction orthogonal to the horizon H(t) remains equal to a constant specified by the user.

Although a prismatic shaped brush may be used in some embodiments, it may be appreciated that a curved or otherwise non-prismatic brush may be equivalently used.

It is contemplated that modifications and combinations of this mechanism will readily occur to those skilled in the art, which modifications and combinations will be within the spirit of the invention and the scope of this invention.

Geobody-Painter Positioning and Activation

In one embodiment, faulted horizon H(t) 130 and flattened horizon H*(t) 132 for a user selected or initialized geological-time (t) may be displayed, for example on adjacent windows, or otherwise, on a computer screen or monitor. Brush B 142 or brush B* 144 may be positioned so that their respective centers CB (xCB, yCB, zCB) and CB* (uCB, vCB, tCB) remain located on faulted horizon H(t) 130 and flattened horizon H*(t) 132, respectively. In alternate embodiments a faulted horizon and flattened horizon may be displayed separately, on separate monitors, or on the same monitor but not at the same time. The centers CB and CB* of brush B 142 or brush B* 144 may be defined, for example, as follows:

Center CB* may be the forward uvt-transformation 100 of center CB; and

Center CB may be the reverse uvt-transformation 112 of center CB*.

In the particular case where brush B* 144 is cut by the image of one or several faults in the G* space, its reverse uvt-transform brush B 142 in the G space may be split into several parts on both sides of these faults.

In one embodiment, the geobody painter editing tool may be set on/off by selecting a dedicated key (e.g., on the keyboard or mouse) or for example by clicking a dedicated widget on the geobody painter graphical user interface. When the geobody painter editing tool is "active," the center CB of brush B 142 and CB* of brush B* 144 may remain on faulted horizon H(t) 130 and flattened horizon H*(t) 132, respectively, at locations corresponding to the position of an input device, e.g., a mouse. The position of brush B 142 and brush B* 144 may be synchronized so that whenever center CB* is moved along flattened horizon H*(t) 132, center CB is moved in a corresponding manner on faulted horizon H(t) 130, and vice versa. For example, when center CB* is moved to a new position, center CB is moved to a position defined by the reverse uvt-transformation 112 of the new position of CB*. Furthermore, when they are moved, brush B* 144 may remain vertically oriented in G* space 106, while brush B 142 may be oriented tangential to the IPG-lines in G space 104.

In one embodiment, various modes of the geobody painter editing tool may be activated, in turn, for example, as follows:

The geobody painter editing tool may be set to "painter-mode," e.g., when the left mouse button (or any other dedicated key) is pressed down; and The geobody painter editing tool may be set to "eraser-mode," e.g., when the middle or right mouse button (or any other dedicated key) is pressed down.

Other methods of user interaction may be used. For example, alternatively or additionally a user may select a field for "painter-mode" or "eraser-mode." In other embodiments, methods other than "painting" and "erasing" may be used to allow a user or a process to alter the physical properties assigned to modeled particles.

Geobody-Painter Usage and Action

The geobody-painter may be used to assign seismic and or geological properties values to cells of seismic cube grid SG 126 covering G space 104 or cells 124 of property grid GG* 122 covering G* space 106. For example, seismic properties values may be assigned to cells 124 of property grid GG* 122 covering G* space 106, for example, as follows:

1) Geobody 138 may be displayed to a user on a monitor (e.g., as shown in FIG. 7), for example:
    a. on faulted horizon H(t) 130 in G space 104 or/and its uvt-transformation image flattened horizon H*(t) 132 in G* space 106 for geological-time (t); or
    b. in a volume visualization of seismic properties, e.g., seismic cube grid SG 126 in G space or/and seismic cube grid SG* 128 in G* space 106, e.g., for example using 3D texture mapping.

2) Each cell 124 C* of property grid GG* 122 covering G* space 106 may be initialized with default value GProp0 for a given geological property GProp;

3) A constant value GProp1 may be selected and assigned to geobody 138. For example:
    a. the constant value GProp1 may be selected, e.g., by a user entering the value in a dedicated field of a graphical interface. Otherwise an automatic or default value may be generated by a computing device;
    b. to detect a target geobody 138, a user may scan a plurality of faulted horizons H(t) 130 and corresponding flattened horizon H*(t) 132 visualized in adjacent windows of a computer screen by changing the geological-time (t) associated therewith, until the target geobody 138 is visible thereon. The user may scan horizons, e.g., using a pointing device or keyboard via user input 965 of FIG. 9. The geological-time (t) may be changed continuously or discretely, e.g., to change the corresponding pair of faulted and/or flattened horizons 130 and 132 displayed on their respective screens. For example, to change the geological-time (t) and/or corresponding faulted and/or flattened horizons 130 and 132 displayed, a user may, for example:
        i. move a mouse wheel or scrolling forward (up) and/or backward (down) to display the faulted and/or flattened horizons 130 and 132 corresponding respectively to higher and lower (z) and (t) coordinates (e.g., where higher (t) coordinates correspond to a younger horizon deposited relatively more recently than do lower (t) coordinates);

ii. move a cursor or dedicated keyboard keys or enter the geological-time (t) in a dedicated field of a graphical user interface.

iii. move a tab on a geological-time-bar to scan through different geological-times.

4) When a target geobody 138 is detected, e.g., by visual inspection of the texture map overlaid on faulted and flattened horizons 130 and 132, e.g., as shown in FIG. 7, a user may proceed to edit properties on or in the neighborhood of the faulted and/or flattened horizons 130 and 132. In one embodiment, the user may assign (or "paint") the property value GProp1 of the target geobody 138 to the property Gprop of the desired points of either flattened or faulted horizons 132 and 130. The corresponding property value GProp1 may be automatically assigned to the corresponding points of the other horizon, e.g., faulted or flattened horizons 130 and 132 using the reverse or/and forward uvt-transforms 112 and 100, respectively. Transforms other than uvt-transforms 112 and/or 100 may be used. The assigned property values corresponding to geobody 138 may be stored in a subset of cells of seismic cube grid SG 126 in G space 104 and/or cells 124 of property grid GG* 122 in G* space 106. A process may proceed, for example, as follows:

a. Select the size and shape of brush B 142 and/or, the size and shape of brush B* 144.

b. Set the geobody painter editing tool to an active mode.

c. Use a pointing device (e.g., controlled by a keyboard or mouse) to select a point located on the target geobody 138 to be center CB of brush B 142 and/or center CB of brush B* 144 on faulted and/or flattened horizons 130 and 132, respectively.

d. To assign properties, a "painting" mode may be activated (e.g., holding down a dedicated key such as a left button of a mouse or the cntrl and v keys on a keyboard) and the input device may be used to move brush B 142 or brush B* 144 along faulted or flattened horizons 130 and 132, respectively, so that brush B 142 or brush B* 144 traces a desired geobody 138. For example, brush B 142 and/or brush B* 144 may be moved along dashed line 140 outlining the regions where a geobody is to be added. When in painting mode, brush B 142 or brush B* 144 may assign the same property value, e.g., GProp1, for the property GProp, to all regions traced by the brush, e.g., all points located within the closed curve of the intersection of brush B 142 or brush B* 144 with faulted and/or flattened horizons 130 or 132, respectively. The property value GProp1 may be stored in cells of seismic cube grid SG 126 in G space 104 and/or in cells 124 of property grid GG* 122 in G* space 106, e.g., for all cells with centers corresponding to the traced points of faulted or flattened horizons 130 and 132, respectively.

e. To delete properties or erase a region painted in step (d) above, an "erase" mode may be activated (e.g., holding down a dedicated key such as a right button of a mouse or the cntrl and x keys on a keyboard) and the input device may be used to move brush B 142 or brush B* 144 along faulted or flattened horizons 130 and 132, respectively, so that brush B 142 or brush B* 144 traces the region of geobody 138 to be removed. When in erase mode, brush B 142 or brush B* 144 may assign the initial or default property value, e.g., GProp0, for the property GProp, to all regions traced by the brush. The property value GProp0 may be stored in cells seismic cube grid SG 126 in G space 104 and/or in cells 124 of property grid GG* 122 in G* space 106, e.g., for all cells with centers corresponding to the traced points of faulted or flattened horizons 130 and 132, respectively.

f. Optionally, the shape, size, and height of brush B 142 and/or brush B* 144 may be changed.

5) STOP

Other operations or series of operations may be used. Although the description above describes changing property value by tracing a region with brush B 142 and/or brush B* 144, embodiments of the invention may include manipulation the shape or size of geobodies 138 in any manner, e.g., including extending, shifting, translating, rotating, shrinking, elongating, or otherwise altering the property values of faulted and/or flattened horizons 130 and 132. In each of these embodiments, an input device may be used to change the set of points or cells to which the geobodies 138 property values are assigned.

In one embodiment, when geobody 138 is partially formed and already has property values assigned thereto, to further edit geobody 138 (e.g., to elongate geobody 138), the property values already assigned to geobody 138 may be copied or sampled (e.g., by clicking on a point of geobody 138 when in a "sample" or "copy" editing mode) and then pasted on desired regions where the geobody 138 may be added (e.g., by clicking on a point of geobody 138 when in a "paste" or "painting" editing mode).

It may be appreciated that painting or assigning property values to vertices, cells or facets changes the data associated with modeled points. For example, when a coordinate (x,y,z) or its uvt-transformation (u,v,t) is painted with a property p0, the coordinate is transformed to (x,y,z,p0) or (u,v,t,p0), respectively. Thus, the geological data of a geophysical subsurface structure, e.g., a particle of sediment, represented by the painted coordinates is altered. In contrast, other mechanisms change the visual aspects of pre-existing properties, for example, by coloring, painting or altering the opacity of data associated with the pre-existing properties, but do not change the properties themselves in the seismic cube grid SG* 128. For example, other mechanisms may change the color for property p0 from red to purple, or from transparent to opaque, but these mechanisms do not add a property value p0 to (x,y,z) or (u,v,t) or do not change a property value from p0 to p1 at these points. For example, a user selects a time range and the horizons corresponding to structures deposited in that time range are made opaque, while horizons corresponding to structures deposited at outside that time range are made transparent. The time range may be altered to make changes in the horizons that are opaque and transparent. In this and other conventional modeling mechanisms, the user merely alters the visual representation of static data and does not alter the actual data itself. While these mechanisms are imperfect, embodiments of the invention may be used in combination therewith.

Other conventional mechanisms teach painting geobodies directly on a seismic cube grid SG 126 in G space 104 without using property grid GG* 122 in G* space 106 or uvt-transformations 100 or 112. Embodiments of the invention provide significant differences and advantages over such mechanisms, for example, by painting properties on a property grid GG* 122 in G* space 106. Some advantages of embodiments of the invention may be seen, in particular, in regions where geobodies are cut by faults, for example as follows (not all advantages may be seen in all embodiments of the invention):

Conventional mechanisms paint geobodies in G space 104, where property values are discontinuous across faults 109. When conventional mechanisms extract and paint geobodies directly on seismic cube grid SG 126 in G space 104, the painting is stopped as soon as a fault is reached. Accordingly, conventional geobody painters cannot paint a geobody that extends to opposite sides of a fault.

In contrast, embodiments of the invention may paint and extract geobodies 138 in G* space 106, where faults 109 vanish. Accordingly, in G* space 106, geobodies 138 may be extracted and painted without interruption from faults or discontinuities. In some embodiments, geobodies 138 may extract and paint points continuously and without interruption in G* space 106, where the points in G* space 106 correspond to points on opposite sides of a fault 109 in G space 104. Once geobodies 138 are painted in G* space 106, the new property values are applied to points on opposite sides of the fault 109 in G space 104, e.g., using the reverse uvt transformation 112. Accordingly, embodiments of the invention may paint and extract geobodies 138 continuously across faults 109.

In some embodiments, the geobody painter editing tool may be used to draw an isolated geobody 138 on property grid GG* 122 in G* space 106, e.g., not overlaid over a pre-existing model or seismic cube. Geobody 138 may be drawn, e.g., in 3D, on a scratch-pad or using an editing application. For example, an isolated geobody 138 may be useful for generating 3D training images in connection with multipoint geo-statistics models. For example, a process may proceed as follows:

1) Faulted or flattened horizons 130 or 132 at a specific geological-time (t) may be selected, e.g., by a user via user input 965 of FIG. 9, for drawing a geobody 138.
2) Each cell C* 124 of property grid GG* 122 covering G* space 106 may be initialized with a default value GProp0 for a geological property GProp.
3) A constant value GProp1 may be selected and assigned to geobody 138. For example:
    a. the constant value GProp1 may be selected, e.g., by entering the value in a dedicated field of a graphical interface. Otherwise an automatic or default value may be generated by a computing device;
    b. A user may scan one or more faulted horizons H(t) 130 in G space 104 and corresponding flattened horizon H*(t) 132 in G* space 106, e.g., visualized in adjacent windows of a computer screen by for example changing the geological-time (t) associated therewith. For example, to change the geological-time (t) and/or corresponding faulted and/or flattened horizons 130 and 132 displayed, a user may, for example:
        i. move a mouse wheel or scrolling forward (up) and/or backward (down) to display the faulted and/or flattened horizons 130 and 132 corresponding respectively to higher and lower (z) and (t) coordinates (e.g., where higher (t) coordinates correspond to a younger horizon deposited relatively more recently than do lower (t) coordinates);
        ii. move a cursor or dedicated keyboard keys or enter the geological-time (t) in a dedicated field of a graphical user interface.
        iii. move a tab on a geological-time-bar to scan through different geological-times.
4) When a user selects a desired faulted and/or flattened horizons 130 and 132 to paint a geobody, the user may assign (or "paint") the property value GProp1 associated with the geobody 138 to the property Gprop of the desired points of either flattened or faulted horizons 132 and 130. The assigned property values corresponding to geobody 138 may be stored in a subset of cells 116 of property grid GG 120 in G space 104 and preferably in cells 124 of property grid GG* 122 in G* space 106. A process may proceed, for example, as follows:
    a. The size and shape of brush B 142 and/or brush B* 144 may be selected, e.g., by a user via user input 965 of FIG. 9.
    b. The geobody painter editing tool may be set to an active mode, e.g., by a user selecting as dedicated key of user input 965 of FIG. 9 such as a left button on a mouse.
    c. Use a cursor or editing device (e.g., controlled by a keyboard or mouse) to select a point to be drawn as center CB of brush B 142 and/or center CB of brush B* 144 on faulted and/or flattened horizons 130 and 132, respectively.
    d. To assign properties, a "painting" mode may be activated (e.g., holding down a dedicated key such as a left button of a mouse or the cntrl and v keys on a keyboard) and the input device may be used to move brush B 142 or brush B* 144 along faulted or flattened horizons 130 and 132, respectively, so that brush B 142 or brush B* 144 traces the desired geobody 138. For example, brush B 142 and/or brush B* 144 may be moved to outline any regions where the geobody is desired. When in painting mode, brush B 142 or brush B* 144 may assign the same property value, e.g., GProp1, for the property GProp, to all regions traced by the brush, e.g., all points located interior to brush B 142 or brush B* 144. For each cell of a of property grid with a center corresponding to a traced point, the property value GProp1 may be stored in the cell. Storing a property value in a cell may mean that the property value may be stored in a memory or storage in a way so that it is associated with, within, or linked to stored cell data. For example, property value may be stored in cells seismic cube grid SG 126 in G space 104 and preferably in cells 124 of property grid GG* 122 in G* space 106.
    e. To delete properties or erase a region painted in step (d) above, an "erase" mode may be activated (e.g., holding down a dedicated key such as a right button of a mouse or the cntrl and x keys on a keyboard) and the input device may be used to move brush B 142 or brush B* 144 along faulted or flattened horizons 130 and 132, respectively, so that brush B 142 or brush B* 144 traces a desired region of geobody 138 to be deleted. When in erase mode, brush B 142 or brush B* 144 may assign the initial or default property value, e.g., GProp0, for the property GProp, to all regions traced by the brush. The property value GProp0 may be stored in cells 116 of grid GG 120 and/or cells of seismic cube grid SG 126 in G space 104 and/or in cells 124 of property grid GG* 122 in G* space 106, e.g., for all cells with centers corresponding to the traced points of faulted or flattened horizons 130 and 132, respectively.
    f. Optionally, the shape, size, and height of an editing tool such as brush B 142 and/or brush B* 144 may be changed (or edited).

5) STOP

Other operations or series of operations may be used, and other specific user interaction systems may be used.

Painting the Seismic Cube

Once property values for a property GProp are stored in cells 124 of property grid GG* 122 in G* space 106, the same property values may be transferred to cells of the seismic cube grid SG 126 in G space 104 (e.g., or vice versa). For example, a process may proceed as follows:

1. for each cell C of the seismic cube grid SG 126:
   a. A reference point RC may be determined. The reference point RC may be inside the cell, for example, the center point of the cell.
   b. A corresponding reference point RC* in G* space 106 may be generated that is the uvt-transformation 100 of the reference point RC.
   c. Cell C* 124 of property grid GG* 122 in G* space 106 may be identified to contain the reference point RC*.
   d. The property value GProp stored in cell C* 124 of property grid GG* 122 in G* space 106 may be copied in cell C of seismic cube grid SG 126 in G space 104. Storing a property value in cell C or 124 may mean that the property value is stored in a memory or storage (e.g., memory 950 of FIG. 9) in a way so that it is associated with, within, or linked to the cell or cell data.
2. STOP According to these operations, when a property value GProp is assigned to a first point RC* or corresponding cell 124 in a first property model, e.g., grid GG* 122 or flattened seismic cube 128, the same property value GProp is assigned to a second point RC or corresponding cell 116 in a second property model, e.g., seismic grid GG 120 or faulted seismic cube 126, wherein the second point RC is the image of the first point RC*, e.g., as defined by the reverse uvt-transformation 112 or another local transform, between the first seismic property model and the second seismic property model.

Other operations or series of operations may be used.

Reference is made to FIG. 9, which schematically illustrates a system including a transmitter, receiver and computing system in accordance with an embodiment of the present invention. Methods disclosed herein may be performed using a system 905 of FIG. 9. In other embodiments, methods used herein may be performed by different systems, having different components.

System 905 may include a transmitter 990, a receiver 920, a computing system 930, and one or more display(s) 980. The aforementioned data, e.g., seismic data used to form intermediate data and finally to model subsurface regions, may be created by processing data generated by transmitter 990 and received by receiver 920. Intermediate data may be stored in memory 950 or other storage units. The aforementioned processes described herein may be performed by code, instructions or software 960 being executed by processor 940 manipulating the data.

Transmitter 990 may transmit signals, for example, acoustic waves, compression waves or other energy rays or waves, that may travel through subsurface (e.g., below land or sea level) structures. The transmitted signals may become incident signals that are incident to subsurface structures. The incident signals may reflect at various transition zones or geological discontinuities throughout the subsurface structures. The reflected signals may include seismic data.

Receiver 920 may accept reflected signal(s) that correspond or relate to incident signals, sent by transmitter 990. Transmitter 990 may transmit output signals. The output of the seismic signals by transmitter 990 may be controlled by a computing system, e.g., computing system 930 or another computing system separate from or internal to transmitter 990. An instruction or command in a computing system may cause transmitter 990 to transmit output signals. The instruction may include directions for signal properties of the transmitted output signals (e.g., such as wavelength and intensity). The instruction to control the output of the seismic signals may be programmed in an external device or program, for example, a computing system, or into transmitter 990 itself.

Computing system 930 may include, for example, any suitable processing system, computing system, computing device, processing device, computer, processor, or the like, and may be implemented using any suitable combination of hardware and/or software. Computing system 930 may include for example one or more processor(s) 940, memory 950 and code, instructions or software 960. Data 955 generated by reflected signals, received by receiver 920, may be transferred, for example, to computing system 930. The data may be stored in the receiver 920 as for example digital information and transferred to computing system 930 by uploading, copying or transmitting the digital information. Processor 940 may communicate with computing system 930 via wired or wireless command and execution signals.

Memory 950 may include cache memory, long term memory such as a hard drive, and/or external memory, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Memory 950 may store instructions (e.g., software 960) and data 955 to execute embodiments of the aforementioned methods, steps and functionality (e.g., in long term memory, such as a hard drive).

Data 955 may include, for example, raw seismic data collected by receiver 920, instructions for building a mesh, instructions for partitioning a mesh, instructions for generating a seismic cube, seismic grid, seismic property model and instructions for processing the collected data to generate a model, or other instructions or data. Memory 950 may store a geological-time function, a model representing a structure when it was originally deposited (e.g., in uvt-space) and/or a model representing the corresponding structure in a present day or recent time period (e.g., in xyz-space). Memory 950 may store seismic property models, e.g., a seismic property grid and seismic cube, in G space and/or G* space and a mesh for generating each seismic property model. Geological models in G space and/or G* space may be, for example, a digital rendering of seismic data, e.g., defined by cells, nodes, vertices, facets, voxels, pixels, etc., that estimate or approximate the likely position of groups of underground particles. Memory 950 may store the cells, nodes, voxels, etc., associated with the models and the model grids. Memory 950 may also store instructions and data allowing a processor to execute global transformation functions (e.g., forward and/or reverse uvt-transformations 100 and 112 of FIG. 1) to transform points in the present day model in G space to the past depositional model in G* space, and vice versa. Memory 950 may also store instructions and data allowing a processor to execute local transformation functions, e.g., local forward and/or reverse uvt-transformations, to transform a designated subset of points in the present day model in G space to corresponding subset of points in the past depositional model in G* space, and vice versa. Data 955 may also include intermediate data generated by these processes and data to be visualized, such as data representing graphical models to be displayed to a user. Memory 950 may store intermediate data. System 930 may include cache memory which may include data duplicating original values stored elsewhere or computed earlier, where the original data may be relatively more expensive to fetch (e.g., due to longer access time) or to compute, compared to the cost of reading the cache memory. Cache memory may include pages, memory lines, or other suitable structures. Additional or other suitable memory may be used.

Computing system 930 may include a computing module having machine-executable instructions. The instructions may include, for example, a data processing mechanism (including, for example, embodiments of methods described herein) and a modeling mechanism. These instructions may be used to cause processor 940 using associated software 960 modules programmed with the instructions to perform the operations described. Alternatively, the operations may be performed by specific hardware that may contain hard-wired logic for performing the operations, or by any combination of programmed computer components and custom hardware components.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Processor 930 may perform various methods described herein. For example, processor 940 may generate a geological time function $t(x,y,z)$ and paleo-geographic coordinate functions $u(x,y,z)$ and $v(x,y,z)$, according embodiments of the invention. The geological time function $t(x,y,z)$ may be an arbitrary monotonic increasing function of time. For example, the geological time function $t(x,y,z)$ may provide the relative times or time order when structures were deposited, not necessarily the real times.

Processor 940 may generate a 3D uvt-transformation based on the one or more global functions or rules, which when applied to each point $(x,y,z)$ generate geological time function $t(x,y,z)$ and paleo-geographic coordinate functions $u(x,y,x)$ and $v(x,y,z)$. The uvt-transformation may transform data points in models between G space and G* space. When processor 940 receives an indication to locally change the uvt-transformation for a subset of points in the models (e.g., via input device 965), processor 940 may generate an updated and locally changed version of the uvt-transformation to replace the uvt-transformation for the subset of points. The updated or new uvt-transformation transforms the subset of points differently than the initial uvt-transformation at least for the local subset of points. The initial and new uvt-transformations may include parameterizations between G space and G* space to transform a present day model in G space of a discontinuous faulted horizon to a single substantially continuous horizon in G* space.

Display 980 may display data from transmitter 990, receiver 920, or computing system 930 or any other suitable systems, devices, or programs, for example, an imaging program or a transmitter or receiver tracking device. Display 980 may include one or more inputs or outputs for displaying data from multiple data sources or to multiple displays. For example display 980 may display visualizations of subsurface models including subsurface features, such as faults, horizons and unconformities.

Display may 980 may display a faulted horizon $H(t_0)$ in G space and a flattened horizon $H^*(t_0)$ in G* space. For example, the models may be displayed separately, adjacent to, or overlapping each other. In one embodiment, a user may scan through a plurality of faulted horizons $H(t)$ and/or corresponding flattened horizon $H^*(t)$ visualized in adjacent windows on display 980 by changing the geological-time (t) associated therewith. The geological-time (t) and/or corresponding faulted and/or flattened horizons displayed may be changed, for example, by moving a mouse wheel or scrolling forward (up) and/or backward (down) to display the faulted and/or flattened horizons corresponding to higher and lower (z) or (t) coordinates, respectively. Higher (t) coordinates typically correspond to a younger horizons deposited relatively more recently than lower (t) coordinates. In another embodiment, geological-time (t) and/or corresponding faulted and/or flattened horizons displayed, may be changed, for example, by moving a cursor or dedicated keyboard keys or by entering a desired geological-time (t) in a dedicated field of a graphical user interface. In yet another embodiment, the geological-time (t) and/or corresponding faulted and/or flattened horizons displayed, may be changed, for example, by moving a tab on a geological-time-bar to scan through different geological-times.

When a faulted horizon $H(t_0)$ in G space and/or a flattened horizon $H^*(t_0)$ in G* space are displayed on display 980, a user may, for example, inspect the horizons to determine any problematic points or points to be changed. For example, the uvt-transformation may erroneously transform a point in G space to the wrong flattened horizon $H^*(t)$ in G* space using the uvt-transformation. Since property values are ideally exactly or approximately constant across horizons in G space and horizontal cross sections in G* space, such an erroneous point may be detected easily, for example, by a user inspecting a display of the flattened horizon $H^*(t)$ in G* space. The user may quickly identify any stray points significantly deviating from the ideally constant property values across the otherwise flattened horizons or horizontal cross sections. For example, when a color map is used, e.g., red corresponding to one property value Gprop1 and purple to another property value Gprop2, a stray point may appear for example as a purple dot in an otherwise red horizontal section (other color schemes or graphical techniques may be used). The user may click the purple point in a 'delete' mode, activate an 'add' mode, and select another red point to replace the purple point, e.g., located in the neighborhood of the purple point. The user may identify points to be changed and the 'add' or 'delete' modes via input device 965, e.g., controlled to click on or highlight the points on display 980.

Alternatively, processor 940 may automatically identify any problematic points or points to be changed by measuring the standard deviation of property values across a horizons or horizontal cross sections in G* space. When processor 940 measures standard deviation values for a property that is greater than a predetermined threshold in a local region (e.g., a neighborhood of a point), processor 940 may automatically identify the deviating point or points and may select the point to be changed and corrected.

When points in the models are locally changed or edited, e.g., added, deleted, moved, or otherwise rearranged, the uvt-transformation (e.g., including the direct and reverse uvt-transformations) associated with the initial locations of the points may be changed. Thus, editing the locations of points, cells, facets, voxels or other features in one or both of the models in G and/or G* space, involves editing the uvt-transformation itself.

When processor 940 accepts an indication (e.g., from a user) to change the uvt-transformation for the subset of points in the models (e.g., selected automatically by processor 940 or by a user via input device 965), processor 940 may generate a new uvt-transformation replacing the initial uvt-transformation. To change the location of each point in the models, e.g., by adding, moving, or rearranging, the point may have a corresponding point in the other model and a new map between those corresponding points may be defined by re-computing the uvt-transformation. The new uvt-transformation may take into account deleted sampling points, new sampling points, or change old sampling points whose location has changed. When the locations of points in one model are altered, the other model may be automatically updated accordingly to the new uvt-transformation. Processor 940 may, for example, in response to a user changing the location of points in one of the models, automatically generate a new uvt-transformation to render a corresponding change in location for corresponding points in the other one of the models.

In one embodiment, a system and method is provided for editing models of physical geological structures. Corresponding points may be edited in the present day and past depositional models and a new uvt-transformation may be generated, where the new uvt-transformation defines the correspondence between the points edited in the present day model and the points edited to the past depositional model. Corresponding points may be added, moved or deleted from the present day and past depositional models and the new uvt-transformation may take those changes into account. The direct uvt-transformation may be injective (i.e., each point in G space has an image in G* space, but not all points in G* space, e.g., eroded points, have an image in G* space). In some embodiments, moving a point from a first location to a second location may be equivalent to deleting the point at the first location and adding a new point at the second location.

Display 980 may display the models in separate pages or windows (or alternately on the same page or window) and a user may select one of the models (e.g., by clicking a 'G space' or 'G* space' button with a pointing device such as a mouse or by scrolling between the models). A user may select a display option to temporarily hide or reveal features, e.g., seismic property models. Property models may be displayed as for example color, texture and/or symbol maps. Property models may be displayed separately, overlaying or instead of other geometric models. Processor 940 may overlay property models onto flattened or faulted horizons or flattened or faulted seismic cubes, e.g., using 3D texture mapping mechanisms.

In one embodiment, the user may edit a property model in the present day or depositional models and the same edit may be automatically rendered on the other model, by processor 940 executing a uvt-transformation. In this way, a user may simultaneously view the property changes to structures in the present and depositional times. Processor 940 may accept graphical user input, e.g., from a property editing tool controllable by input device 965, for editing property values assigned to points in a model in G space or G* space. The editing tool may allow a user to operate in modes such as "painting" and "erasing" modes. In the "painting" mode, the editing tool may be used to assign property values to points in G space or G* space (e.g., using brushes 142 or 144 of FIG. 8, respectively), using the brush to trace the points. The property values assigned may be designated, e.g., to represent a particular geobody such as a channel or dune. In the "erase" mode, the editing tool may be used to delete a property value in G space or G*, e.g., resetting or re-assigning the property values of all the points traced by the brush, to their initial values before brushing occurred. Multiple different properties may be changed accordingly. For example, to paint three distinct geobodies on a horizon in G space or G* space, three separate property values may be used.

To begin painting, a user may select a faulted horizon $H(t_o)$ in G space and a flattened horizon $H^*(t_o)$ in G* space to be displayed on display may 980. For example, the models may be displayed separately, adjacent to, or overlapping each other. In one embodiment, a user may scan through a plurality of faulted horizons H(t) and/or corresponding flattened horizon H*(t) visualized in adjacent windows on display 980. Processor 940 may provide a graphical user interface for a user to control and edit property values on faulted horizon $H(t_o)$ in G space and a flattened horizon $H^*(t_o)$ in G* space. The graphical user interface may provide options for a user to select or create the size, height and shape of the brush or property editing tool. The graphical user interface may include a plurality of modes, e.g., active (for editing), inactive (for viewing), paint mode, erase mode, extract geobody mode, copy geobody mode, etc. Processor 940 may receive activation of paint mode and movement commands, e.g., from input device 965, for moving the editing brush. When in painting mode, the editing brush may assign the same user defined property value, e.g., GProp1, to all regions traced by the brush, e.g., all points on the horizons located within the brush. When in erase mode, the initial or default property value, e.g., GProp0, may be assigned to all regions traced by the brush. The property values may be stored in cells of seismic cube grid SG and/or property grid GG in G space and/or in cells of seismic cube grid SG* or property grid GG* in G* space, e.g., for all cells traced by the brush.

When property values assigned to points in a first model are initially changed, processor 940 may automatically alter the second model accordingly. For example, processor 940 may assign the same edited property values to corresponding points of the second model, wherein the corresponding points in the second model are the image of the initially changed points in the first model. In one embodiment, once property values for a property are stored in cells in G space or G* space, the same property values may be transferred to corresponding cells in the other space, e.g., G* space or G space, respectively. Property values may preferably be changed initially in the past depositional model in G* space and then automatically edited in the present day model in G space. In one embodiment, when the property values associated with a geobody are first edited at points of the past depositional model corresponding to points on opposite sides of a fault in the present day model, the property values associated with a geobody may be automatically edited to extend across opposite sides of the fault in the present day model.

Input device(s) 965 may include one or more of, for example, a keyboard, pointing device (e.g., mouse, trackball, pen, touch screen), or cursor direction keys, communicating information and command selections to processor 940. Input device 965 may communicate user direction information and command selections to the processor 940. For example, a user may use input device 965 to edit the locations or property values of points in the models (e.g., by pointing a 'select', 'add', 'delete', 'paint', 'erase' button on a display 980 monitor adjacent to the model using a cursor controlled by a mouse).

Processor 940 may include, for example, one or more processors, controllers, central processing units ("CPUs"), or graphical processing units ("GPUs"). Software 960 may be stored, for example, in memory 950. Software 960 may include any suitable software, for example, DSI software.

Processor 940 may generate corresponding models in G space and G* space, for example, using data 955 from memory 950. In one embodiment, a model may simulate structural, spatial, seismic or geological properties of a subsurface region, such as, porosity or permeability throughout geological terrains.

Processor 940 may initially generate a three dimensional mesh, lattice, or collection of nodes that spans or covers a domain of interest. The domain may cover a portion or entirety of the three-dimensional space sought to be modeled. Processor 940 may automatically compute the domain to be modeled and the corresponding mesh based on the collected seismic data so that the mesh covers a portion or the entirety of the three-dimensional space from which seismic data is collected (e.g., the studied subsurface region). Alternatively or additionally, the domain or mesh may be selected or modified by a user, for example, entering coordinates or highlighting regions of a simulated optional domain or mesh. For example, the user may select a domain or mesh to model a region of the Earth that is greater than a user-selected subsurface distance (e.g., 100 meters) below the Earth's surface, a domain that occurs relative to geological features (e.g., to one side of a known fault or riverbed), or a domain that occurs relative to modeled structures (e.g., between modeled horizons $H(t_1)$ and $H(t_{100})$). Processor 940 may execute software 960 to partition the mesh or domain into a plurality of three-dimensional (3D) cells, columns, or other modeled data (e.g., represented by voxels, pixels, data points, bits and bytes, computer code or functions stored in memory 950). The cells or voxels may have hexahedral, tetrahedral, or any other polygonal shapes, and preferably three-dimensional shapes. Alternatively, data may include zero-dimensional nodes, one-dimensional segments, two-dimensional facet and three-dimensional elements of volume, staggered in a three-dimensional space to form three-dimensional data structures, such as cells, columns or voxels. The cells may preferably conform to and approximate the orientation of faults and unconformities. Each cell may include faces, edges and/or vertices. Each cell or node may correspond to or represent one or more particles of a subsurface material in the Earth (e.g., a cell may include many cubic meters of particles). Each cell, face, edge, vertex or node may be located, e.g., in a grid or lattice, throughout the model. In contrast, a point of the model may be located at any location in the modeled domain, for example, in a cell between adjacent nodes.

As shown in FIG. 4, model 110 in G* space 106, i.e., modeling properties at depositional geological time (the time the structures being modeled were originally deposited) may be generated using a regular mesh, such as property grid 122 (e.g., having a uniform lattice or grid structure or nodes and cells 124). In contrast, model 108 of FIG. 1 may be generated using an irregular mesh (having an irregular lattice or arrangement or nodes or cells 116). Again in reference to FIG. 9, data collected by receiver 920 after the time of deposition in a present day or present time period, faults and unconformities that have developed since the original time of deposition, e.g., based on tectonic motion, erosion, or other environmental factors, may disrupt the regular structure of the geological domain. Accordingly, an irregular mesh may be used to model present day geological structures, for example, so that at least some faces, edges, or surfaces of cells may be oriented parallel to faults or unconformities, and may not be intersected thereby. In one embodiment, a mesh may be generated based on data collected by receiver 920, alternatively, a generic mesh may be generated to span the domain and the data collected by receiver 920 may be used to modify the structure thereof. For example, the data collected may be used to generate a set of point values at "sampling point." The values at these points may reorient the nodes or cells of the mesh to generate a model that spatially or otherwise represents the geological data collected from the Earth. Other or different structures, data points, or sequences of steps may be used to process collected geological data to generate a model. The various processes described herein (e.g., generating models) may be performed by manipulating such modeling data.

The geological-time function $t(x,y,z)$ and the paleo-geographic coordinates $u(x,y,z)$ and $v(x,y,z)$ may generate a uvt-transformation defined at a finite number of nodes or sampling points based on real data corresponding to a subsurface structure, e.g., one or more particles or a volume of particles of Earth. These functions may be approximated between nodes of a mesh (e.g., grid GG 120 in G space 104 in FIG. 1) to continuously represent the subsurface structure, or alternatively, depending on the resolution in which the data is modeled may represent discrete or periodic subsurface structures, e.g., particles or volumes of Earth that are spaced from each other. A local transformation may be considered in one embodiment discrete parameterizations of a finite number of points with locations different than that defined by the global transformation.

It may be appreciated that representing seismic structures, features and locations in either the present day model or past depositional model may refer to creating an estimate or approximation of these locations and features in their respective models. Although ideally these estimates or approximations of locations and features are accurate, in some cases, for example, the may be only partially accurate or inaccurate.

In one embodiment, input data to computing system 930 may include horizon sampling points, including well paths, well markers, or other data. Representations of sampling points may be displayed on the horizon model. Some sampling points, e.g., corresponding to erroneous points in G* space forming non-uniform seismic property values, may be removed or moved in the model or may have their property values changed.

Fault surfaces, horizon surfaces, model boundaries (e.g., as lines or transparent surfaces) may be modeled and displayed on display 980. The paleo-geographic coordinate functions $u(x,y,z)$ and $v(x,y,z)$ of the uvt-transformation may be "painted" on horizons as a grid (e.g., each line of the grid may correspond to a constant value for function (u) or the function (v)). The model may be displayed, for example in geological space or in geo-chronological space or both at the same time.

Figure 10:
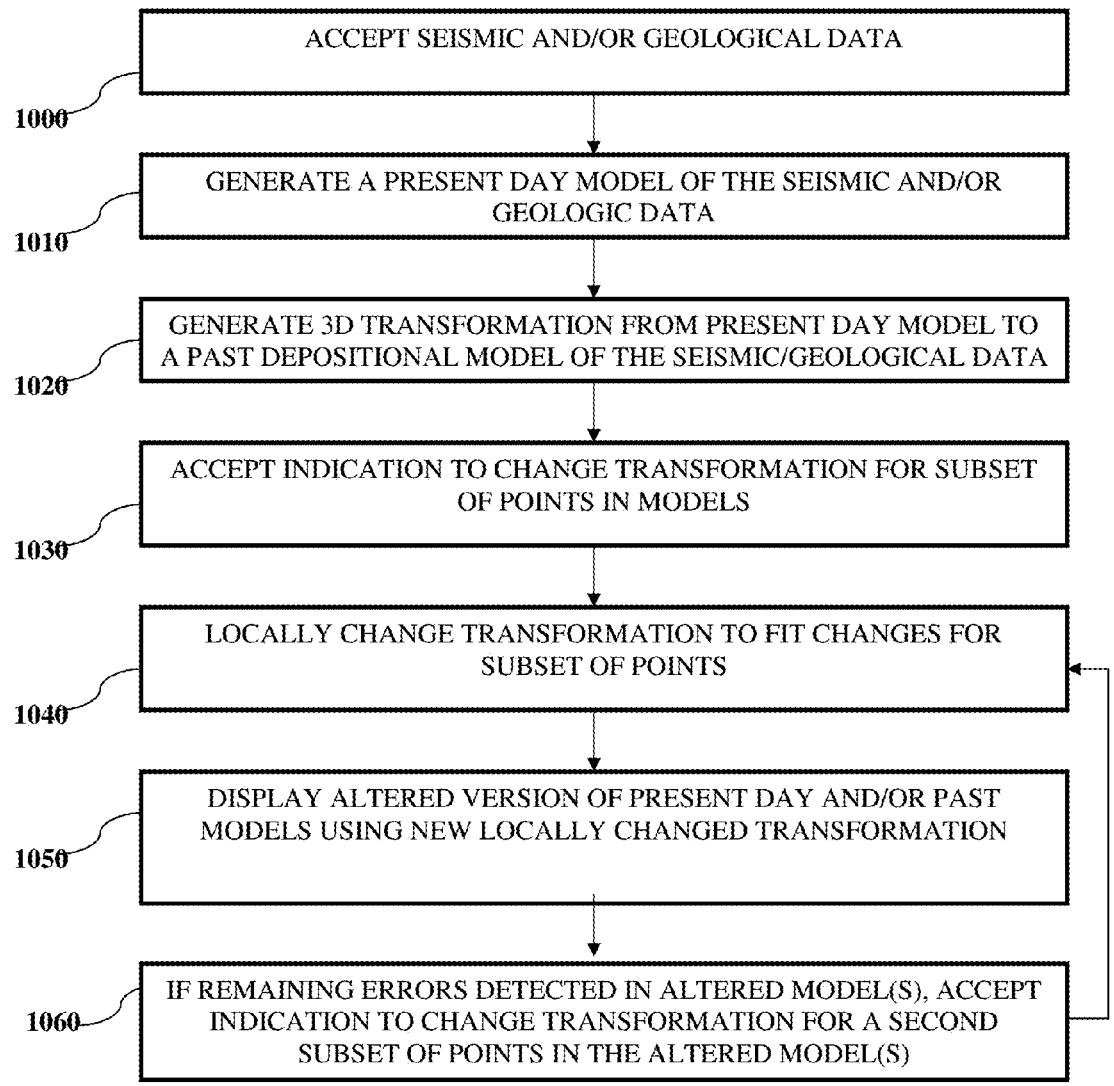
FIGS. 10-11 are flowcharts of methods according to embodiments of the invention.

Reference is made to FIG. 10, which is a flowchart of a method for modeling a subsurface structure at a time period when the structure was originally formed, which may be performed using system 905 of FIG. 9. Other operations or series of operations may be used, and the exact set of operations shown below may be varied.

In operation 1000, a computing device (e.g. processor 940 of FIG. 9) may accept seismic data (e.g., associated with seismic cubes) and/or geologic data (e.g., well markers along well paths). The seismic data may include raw data, e.g., signals received from the Earth, such as, acoustic waves, compression waves or other energy rays or waves, that may travel through subsurface (e.g., below land or sea level) structures. Alternatively, the computing device may accept data processed from the raw data or other data not directly collected from the Earth, but that is simulated to represent data within the Earth. For example, a present day model may represent actual structures within the Earth, while a depositional model is a simulation of how those structures appeared in the past when they were deposited. Furthermore, seismic and geological data may be edited, added, drawn, created, or manipulated, e.g., within a model.

In operation 1010, the computing device may generate a present day model having points representing present locations of the physical geological structures.

In operation 1020, to generate a second past depositional model, the computing device may generate a 3D transformation (e.g., uvt-transformation 100 and 112 of FIG. 1) from the present day model to the past depositional model having points representing locations where the physical geological structures were originally deposited. The transformation may be based on one or more global functions initially applied to all points in the models.

In operation 1030, the computing device may accept, e.g. from a user, an indication to locally change the transformation for a subset of points in the models. The subset of points may be accepted from a user selecting the subset of points from one of the models, e.g., via user input device(s) 965. To identify points to change, in one embodiment, a user may inspect seismic property values displayed on a past depositional model. Since seismic properties are ideally horizontally uniform throughout the model, any variations or stray points deviating from the ideal uniform behavior may be easily identified and selected by the user. Alternatively, the subset of points may be selected automatically by a computing device. In one embodiment, the subset of points may include points having seismic property values that are substantially different than the seismic property values of other points located on the same horizon or horizontal cross-section of the past depositional model. The uvt-transformation as it applies to the subset of points may be inaccurate and may be edited and corrected.

In operation 1040, the computing device may locally change the transformation to fit the changes for the subset of points indicated in step 1030. For each point changed in the models, e.g., added, moved, or rearranged, the point may have a corresponding changed or pre-existing point in the other model and the map between those points may be defined by the locally changed or altered version of the uvt-transformation. The locally change (new) uvt-transformation may differ from the initial uvt-transformation in that the new uvt-transformation is typically not generated based on the same data (set of sampling points) as the initial uvt-transformation. The new uvt-transformation may be re-interpolated to fit translated, rotated or otherwise moved sampling points, new or added sampling points, deleted or removed sampling points, e.g., to replace the deleted subset of points, or change the correlation between points. When points in one model are altered, the other model may be automatically updated accordingly by uvt-transformation for each altered point. The computing device may, for example, in response to a user selecting a subset of points to be changed in one of the models, may automatically generate the uvt-transformation between the subset of points and a second subset of points in the other model.

In operation 1050, a display device (e.g. display 980 of FIG. 9) may display an altered or updated version of the present day and depositional models where the points in the models are related by the locally changed uvt-transformation.

In operation 1060, if remaining errors are detected in either the present day or past depositional model, a process may return to step 1030 to iteratively generate one or more additional altered models, for example, incrementally improving in accuracy in each iteration.

The computing device may accept the data used in the aforementioned operations as for example a set of data reflected from a subsurface geological feature, or such data augmented by another process.

Figure 11:
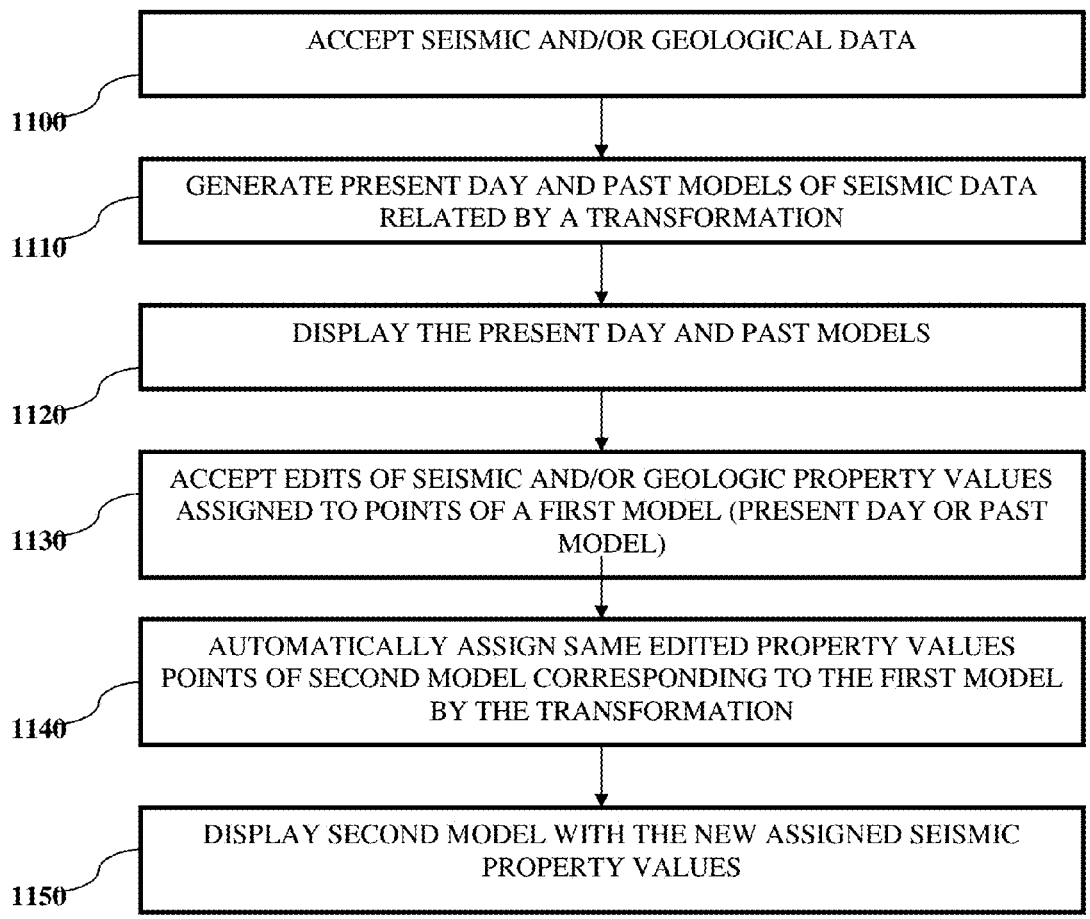

Reference is made to FIG. 11, which is a flowchart of a method for transforming subsurface models modeling a terrain, which may be performed using system 905 of FIG. 9. Other operations or series of operations may be used, and the exact set of steps shown below may be varied.

In operation 1100, a computing device (e.g. processor 940 of FIG. 9) may accept seismic (e.g., a seismic cube) and/or geologic data (e.g., well markers along well paths).

In operation 1110, the computing device may generate a first model and a second model, wherein one model represents present locations of the physical geological structures and the other model represents locations where the physical geological structures were originally deposited in the past. The first and second models are related by a transformation, e.g., a 3D forward and reverse uvt transformation. Other transformations or underground modeling systems may be used.

In operation 1120, the computing device may display the first model and the second model on a display (e.g. display 980 of FIG. 9). The first and second models may be displayed in adjacent, sequential, alternate, and/or separate windows of a monitor.

In operation 1130, the computing device may accept, e.g., from a user operating an input device, a graphical user input for editing geological property and/or seismic cube property values assigned to a first subset of points of the first model. Editing property values may include changing, adding, or deleting property values associated with the points. In one example, a user may assign or "paint" a geological property value with a brush onto horizons in present day G space or past depositional G* space (e.g., using editing tools such as brushes 142 or 144, respectively), e.g., assigning a property value, e.g., Gprop1, to the points traced by the brush. In another example, a user may delete or "erase" a property value with a brush onto horizons in G space or G* space (e.g., using brushes 142 or 144, respectively), e.g., resetting or re-assigning the property value to a previously assigned or default value, e.g., Gprop0. Multiple different properties may be changed.

In operation 1140, the computing device may automatically assign the same edited property values to a second subset of points of the second model, where the second subset of points are the image of the first subset of points as defined by the transformation between the first and second models. In the example where the brush is in a painting mode, assigning property values, Gprop1, to the first subset of points, the computing device may automatically assign the same property values, Gprop1, to the image of the first set of points under the transformation. In the example where the brush is in an erasing mode, resetting property values, Gprop0, to the first subset of points, the computing device may automatically reset the same property values, Gprop0, to the image of the first set of points under the transformation.

Accordingly, when a property value is assigned to a first point in the first model, the same property value may be assigned to a second point (e.g., the image of the first point) in the second model. The property values of the first and second subsets of points may be edited without altering the transformation between the first and second models.

In operation 1150, a display device (e.g. display 980 of FIG. 9) may display the second subset of points in the second model with the automatically assigned property values. Optionally, the display device may also display the first model.

The computing device may accept the data used in the aforementioned operations as for example a set of data reflected from a subsurface geological feature, or such data augmented by another process.

In contrast to embodiments described in reference to FIG. 10, in which the locations of points or features (e.g., horizons) are changed, e.g., by moving, adding, deleting or otherwise changing location features of the models, in embodiments described in FIG. 11, the locations of the points may be left unchanged and only the property values of the points are changed. Furthermore, in contrast to embodiments described in reference to FIG. 10, in which edits to the model cause the transformation that relates the two models to be changed, in embodiments described in FIG. 11, the transformation that relates the two models is typically not changed. Although these are provided in some embodiments, in other embodiments features from embodiments of FIGS. 10 and 11 may be combined. For example, points forming non-uniform property values across horizons in G space or horizontal cross sections in G* space may be removed or moved in the model (e.g., according to embodiments of FIG. 10) or may have their property values changed so that they match the property values of the other points in the horizons or horizontal cross sections (e.g., according to embodiments of FIG. 11). In one example, when a color map is used, e.g., red corresponding to one property value Gprop1 and purple to another property value Gprop2, a stray point may appear as a purple dot in an otherwise red horizontal section. According to embodiments of FIG. 10, a user may choose to replace the point having property value Gprop2 represented by a purple dot with another point having property value Gprop1 represented by a red dot, e.g., by clicking on the purple dot in a 'delete' mode, and clicking a neighboring red dot activate in an 'add' mode. According to embodiments of FIG. 11, a user may select the property value Gprop represented by red, activate the "paint" mode and trace a brush over the purple dot to change the property value associated therewith from Gprop2 (purple) to Gprop1 (red). The user may identify points to be changed via input device 965 of FIG. 9, e.g., controlled to click on or otherwise select the points on display 980 of FIG. 9.

In an embodiment of the invention, a method and system is provided for modelling physical geological structures. Seismic data (e.g., stored with seismic cubes) and/or geologic data (e.g., well markers along well paths) may be accepted. A 3D transformation may be generated between a 3D present day model having points representing present locations of the physical geological structures and a 3D past depositional model having points representing locations where the physical geological structures were originally deposited. An indication may be accepted to locally change the 3D transformation for a subset of points in a first model of the models. The 3D transformation may be locally changed for the subset of points, for example, by adding, removing or moving existing sampling points. The uvt-transformation may be updated to take the new set of sampling points into account. A locally altered or updated version of the first model may be displayed. Local changes to the first model may be defined by the locally changed 3D transformation.

Updating or locally changing the transformation to take into account an edited subset of sampling points in a first model and may cause the image of those points in the second model to be changed to points different than the image points defined by the initial transformation.

Locally changing the 3D transformation for the subset of points may cause the subset of points to be deleted or removed from the first model and the image points of the subset of points under the 3D transformation to be deleted or removed from a second model of the models. Locally changing the 3D transformation for the subset of points may cause the subset of points to be added to the first model and the image points of the subset of points under the 3D transformation to be added to a second model of the models. Locally changing the 3D transformation for the subset of points in the first model may cause the image of those points in a second model of the models to be changed to points different than the image points defined by the initial 3D transformation.

The subset of points may be replaced with a new subset of points in the first model (e.g., in G space or G* space) and a subset of points corresponding to the transformation (e.g., reverse uvt-transformation or forward uvt-transformation, respectively) of the replaced subset of points may be replaced with a new subset of points corresponding to the reverse transformation of the new subset of points in a second model of the models (e.g., in G* space or G space, respectively).

In response to accepting the indication to locally change the subset of points in the first model, points in a second model of the models from which the subset of points are transformed by the changed 3D transformation may be updated, e.g. automatically.

The subset of points may be selected, e.g., automatically, from the past depositional model by for example a computing device to be points having property values that are different than the property values of other points located on the same horizon or horizontal cross-section of the past depositional model. The property values may be stored associated with the storage of cells of the past depositional model.

In an embodiment of the invention, a method and device is provided for simultaneously editing corresponding models representing the same physical geological structures. Seismic data (e.g., stored with seismic cubes) and/or geologic data (e.g., well markers along well paths) may be accepted. A first model and a second model may be displayed. One of the models may represent present day locations of the physical geological structures and the other one of the models may represent locations where the physical geological structures were originally deposited in the past. The first and second models may be related by a 3D transformation. Graphical user input may be accepted for editing property values assigned to a first subset of points of the first model. The edited property values may be automatically assigned to a second subset of points of the second model, where the second subset of points are the image of the first subset of points as defined by the 3D transformation between the first and second models. The second subset of points may be displayed in the second model with the automatically assigned property values.

When one property value is assigned to a first point in the first model, the same property value may be assigned to a second point in the second model, wherein the second point is the image of the first point as defined by the 3D transformation between the first and second models. Editing property values may include changing, adding, removing or deleting property values. The same property values may be assigned to points in the first and second models which are each other's images under the 3D transformation. The property values may be associated with a geobody.

The graphical user input may be generated in a for example computing device using a graphical editing tool. The property values of the first and second subsets of points may be painted on or erased from at least one of the models using the graphical editing tool without altering the locations of points in the first and second models.

Property values may first be edited in the past depositional model and then automatically edited in the present location model or may first be edited in the present location model and then automatically edited in the past depositional model. When the property values associated with a geobody are first edited at points in the past depositional model that correspond to points on opposite sides of a fault of the present location model, the property values associated with a geobody may be automatically edited to extend across opposite sides of the fault.

In an embodiment of the invention, a memory or other storage device may be provided to store a 3D transformation between a 3D present day model having points representing present locations of the physical geological structures and a 3D past depositional model having points representing locations where the physical geological structures were originally deposited. A processor or controller may be provided to accept an indication to locally change the 3D transformation for a subset of points in a first model of the models and to locally change the 3D transformation for the subset of points. A display may be provided to display a locally altered version the first model. Local changes to the first model may be defined by the locally changed 3D transformation.

The processor may locally change or update the 3D transformation to fit a new updated set of sampling points. The processor may locally change the 3D transformation for the new updated subset of points by deleting the subset of points from the first model and deleting the image points of the subset of points under the 3D transformation from a second model of the models. The processor may locally change the 3D transformation for the subset of points by adding the subset of points to the first model and adding the image points of the subset of points under the 3D transformation to a second model of the models. The processor may locally change the 3D transformation for the subset of points by changing the image of those points in a second model of the models to points different than the image points defined by the initial 3D transformation.

The processor may replace the subset of points with a new subset of points in the first model (e.g., in G space or G* space) and may replace a subset of points corresponding to the transformation (e.g., reverse uvt-transformation or forward uvt-transformation, respectively) of the replaced subset of points with a new subset of points corresponding to the reverse transformation of the new subset of points in a second model of the models (e.g., in G* space or G space, respectively).

In response to accepting the indication to update or locally change the subset of points in the first model, the processor may automatically update points in a second model of the models from which the subset of points are transformed by the locally changed 3D transformation.

The processor may automatically select the subset of points from the past depositional model to be points having property values that are different than the property values of other points located on the same horizon or horizontal cross-section of the past depositional model.

The processor may accept graphical user input editing property values assigned to the subset of points of the first model and may automatically assign edited property values to a second subset of points of a second model of the models. The second subset of points may be the image of the first subset of points as defined by the 3D transformation between the first and second models.

In the foregoing description, various aspects of the present invention have been described. For purposes of explanation, specific configurations and details have been set forth in order to provide a thorough understanding of the present invention. However, it will also be apparent to one skilled in the art that the present invention may be practiced without the specific details presented herein. Furthermore, well known features may have been omitted or simplified in order not to obscure the present invention. Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may manipulate data representations of real-world objects and entities such as underground geological features, including faults, horizons and other features. Data received by for example a receiver receiving waves generated by an air gun or explosives may be manipulated and stored, e.g., in memory 950, and data such as images representing underground features may be presented to a user, e.g., as a visualization on display 980.

When used herein, geological features such as horizons and faults may refer to the actual geological feature existing in the real world, or computer data representing such features (e.g., stored in a memory or mass storage device). Some features when represented in a computing device may be approximations or estimates of a real world feature, or a virtual or idealized feature, such as an idealized horizon as produced in a uvt-transform. A model, or a model representing subsurface features or the location of those features, is typically an estimate or a "model", which may approximate or estimate the physical subsurface structure being modeled with more or less accuracy.

It should be recognized that embodiments of the present invention may solve one or more of the objectives and/or challenges described in the background, and that embodiments of the invention need not meet every one of the above objectives and/or challenges to come within the scope of the present invention. Various embodiments have been presented. Each of these embodiments may of course include features from other embodiments presented, and embodiments not specifically described may include various features described herein. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

The invention claimed is:

1. A method of editing a dual model of physical geological structures using a pair of twin three-dimensional (3D) volume painters, the method comprising:
accepting geological data;
generating a dual model comprising a 3D present day model having points representing present locations of the physical geological structures and a 3D past depositional model having points representing locations where the physical geological structures were computed to be originally deposited;
generating a pair of twin 3D volume painters comprising one present day painter volume located in the 3D present day model and another past depositional painter volume located in the 3D past depositional model;
editing the dual model such that when the present day painter volume is moved or used in the 3D present day model, a simultaneous and corresponding movement or usage is executed in the 3D past depositional model, and vice versa; and
displaying the edited dual model.

2. The method of claim 1, wherein the pair of painter volumes are related by a 3D transformation between the 3D present day model and the 3D past depositional model.

3. The method of claim 2, wherein the present day painter volume and the past depositional painter volume are simultaneously centered on a point in the 3D present day model and the transformation of the point in the 3D past depositional model, respectively.

4. The method of claim 2, wherein when the past depositional painter volume crosses the transformation of a fault in the 3D past depositional model, the present day painter volume includes disconnected volumes on both parts of the fault in the 3D present day model.

5. The method of claim 2, wherein the present day painter volume is moved onto and across a faulted horizon in the 3D present day model and the past depositional painter volume is moved onto and across a flattened horizon that is the transformation image of the faulted horizon in the 3D past depositional model.

6. The method of claim 5, wherein:
in the 3D past depositional model, the past depositional painter volume moving onto the flattened horizon includes:
top and bottom faces located on adjacent horizons above and below the flattened horizon, respectively, and
vertical lateral faces; and
in the 3D present day model, the present day painter volume moving onto the faulted horizon includes:
top and bottom faces located on adjacent horizons above and below the faulted horizon respectively, and
lateral faces tangential to Iso-Paleo-Geographic (IPG) lines that are curvilinear in the 3D present day model and transformed from vertical straight-lines in the 3D past depositional model under the transformation.

7. The method of claim 1, wherein editing the dual model comprises operating the pair of twin 3D volume painters in painting or erasing modes to edit the seismic or geological property data of the 3D present day model and the 3D past depositional model.

8. The method of claim 1, wherein the pair of twin 3D volume painters have a shape selected from the group consisting of: a sphere, half a sphere, an ellipsoid, half an ellipsoid, a polyhedron, and a prism.

9. The method of claim 1 comprising receiving selection by a user of a size or shape of the pair of twin 3D volume painters.

10. The method of claim 1 comprising displaying the present day painter volume and the past depositional painter volume on adjacent windows on a computer screen with the corresponding 3D present day model and 3D past depositional model, respectively.

11. A system comprising:
a memory configured to store a dual model comprising a 3D present day model having points representing present locations of physical geological structures and a 3D past depositional model having points representing locations where the physical geological structures were computed to be originally deposited; and
one or more processors configured to:
generate a pair of twin 3D volume painters comprising one present day painter volume located in the 3D present day model and another past depositional painter volume located in the 3D past depositional model;
edit the dual model such that when the present day painter volume is moved or used in the 3D present day model, a simultaneous and corresponding movement or usage is executed in the 3D past depositional model, and vice versa; and
display the edited dual model.

12. The system of claim 11, wherein the one or more processors are configured to generate the pair of painter volumes to be related by a 3D transformation between the 3D present day model and the 3D past depositional model.

13. The system of claim 12, wherein the one or more processors are configured to generate the present day painter volume and the past depositional painter volume to be simultaneously centered on a point in the 3D present day model and the transformation of the point in the 3D past depositional model, respectively.

14. The system of claim 12, wherein when the past depositional painter volume crosses the transformation of a fault in the 3D past depositional model, the one or more processors are configured to generate the present day painter volume to include disconnected volumes on both parts of the fault in the 3D present day model.

15. The system of claim 12, wherein the one or more processors are configured to move the present day painter volume onto and across a faulted horizon in the 3D present day model and move the past depositional painter volume onto and across a flattened horizon that is the transformation image of the faulted horizon in the 3D past depositional model.

16. The system of claim 15, wherein the one or more processors are configured to generate the pair of twin 3D volume painters such that:
in the 3D past depositional model, the past depositional painter volume moving onto the flattened horizon includes:

top and bottom faces located on adjacent horizons above and below the flattened horizon, respectively, and vertical lateral faces, and in the 3D present day model, the present day painter volume moving onto the faulted horizon includes:

top and bottom faces located on adjacent horizons above and below the faulted horizon respectively, and lateral faces tangential to Iso-Paleo-Geographic (IPG) lines that are curvilinear in the 3D present day model and transformed from vertical straight-lines in the 3D past depositional model under the transformation.

17. The system of claim 11, wherein the one or more processors are configured to edit the dual model by operating the pair of twin 3D volume painters in painting or erasing modes to edit the seismic or geological property data of the 3D present day model and the 3D past depositional model.

18. The system of claim 11, wherein the one or more processors are configured to generate the pair of twin 3D volume painters that have a shape selected from the group consisting of: a sphere, half a sphere, an ellipsoid, half an ellipsoid, a polyhedron, and a prism.

19. The system of claim 11, wherein the one or more processors are configured to receive selection by a user of a size or shape of the pair of twin 3D volume painters.

20. The system of claim 11, wherein the one or more processors are configured to display the present day painter volume and the past depositional painter volume on adjacent windows on a computer screen with the corresponding 3D present day model and 3D past depositional model, respectively.

* * * * *